US011242363B2

(12) United States Patent
Veige et al.

(10) Patent No.: US 11,242,363 B2
(45) Date of Patent: Feb. 8, 2022

(54) COMPOSITIONS AND METHODS FOR STEREOREGULAR RING EXPANSION METATHESIS POLYMERIZATION

(71) Applicant: University of Florida Research Foundation, Inc., Gainesville, FL (US)

(72) Inventors: Adam S. Veige, Gainesville, FL (US); Vineet K. Jakhar, Gainesville, FL (US); Muhammad Tariq Jan, Khyber Paktunkhwa (PK)

(73) Assignee: University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 16/767,697

(22) PCT Filed: Nov. 30, 2018

(86) PCT No.: PCT/US2018/063368
§ 371 (c)(1),
(2) Date: May 28, 2020

(87) PCT Pub. No.: WO2019/108969
PCT Pub. Date: Jun. 6, 2019

(65) Prior Publication Data
US 2020/0291051 A1    Sep. 17, 2020

Related U.S. Application Data

(60) Provisional application No. 62/593,580, filed on Dec. 1, 2017.

(51) Int. Cl.
*C07F 11/00* (2006.01)
*C08F 132/08* (2006.01)

(52) U.S. Cl.
CPC ............ *C07F 11/00* (2013.01); *C08F 132/08* (2013.01)

(58) Field of Classification Search
CPC ............................... C07F 11/00; C08F 132/08
USPC ......................................................... 526/104
See application file for complete search history.

(56) References Cited

U.S. PATENT DOCUMENTS

| 2008/0269445 A1 | 10/2008 | Mihan |
| 2015/0141603 A1 | 5/2015 | Ung et al. |
| 2015/0259361 A1 | 9/2015 | Luo et al. |

OTHER PUBLICATIONS

Jan et al., Synthesis and characterization of a trianionic pincer supported Mo-alkylidene anion and alkyne insertion into a Mo(IV)-Cpincer bond to form metallocyclopropene(η2-vinyl) complexes, J. Org. Che., 696(25):4079-4089 (2011).*
Gonsales et al., Highly tactic cyclic polynorbornene: stereoselective ring expansion metathesis polymerization of norbornene catalyzed by a new tethered tungsten-alkylidene catalyst, J. Am. Chem. Soc., 138:4996-4999 (2016).
International Application No. PCT/US2018/063368, International Preliminary Reporton Patentability, dated Jun. 11, 2020.
International Application No. PCT/US2018/063368, International Search Report and Written Opinion, dated Feb. 14, 2019.
(Continued)

*Primary Examiner* — William K Cheung
(74) *Attorney, Agent, or Firm* — Marshall, Gerstein & Borun LLP

(57) ABSTRACT

Disclosed are to metallocyclopropene complexes, methods of making same, methods for ring expansion metathesis polymerization, and polymers prepared by the methods for ring expansion metathesis polymerization.

20 Claims, 17 Drawing Sheets

(56) References Cited

OTHER PUBLICATIONS

Jan et al., Synthesis and characterization of a trianionic pincer supported Mo-alkylidene anion and alkyne insertion into a Mo(IV)-Cpincer bond to form metallocyclopropene(h2-vinyl) complexes, J. Org. Che., 696(25):4079-4089 (2011).

Kuppuswany et al., Synthesis and Characterization of tungsten(VI) alkylidene and alkylidyne complexes supported by and [OCO]3 trianionic pincer ligand: progress toward the [tBuOCO]W=CC(CH3)3 fragment, Center for Catalysis, University of Florida, S1-S57 (2011).

Nadif et al., Introducing "Ynene" Metathesis: Ring-expansion metathesis polymerization leads to highly Cis and syndiotactic cyclic polymers of norbornene, J. Am. Chem. Soc., 138:6408-6411 (2016).

* cited by examiner

COMPOSITIONS AND METHODS FOR STEREOREGULAR RING EXPANSION METATHESIS POLYMERIZATION

CROSS-REFERENCE TO RELATED APPLICATIONS

This application is a national stage application of PCT international application PCT/US18/63368 filed on Nov. 30, 2018, which claims the benefit under 35 U.S.C. § 119 of U.S. Provisional Patent Application No. 62/593,580, filed Dec. 1, 2017, the entire disclosures of which are incorporated herein by reference.

STATEMENT REGARDING FEDERALLY SPONSORED RESEARCH OR DEVELOPMENT

This invention was made with U.S. government support under CHE1565654 awarded by the National Science Foundation. The U.S. government has certain rights in the invention.

SUMMARY

In accordance with the purpose(s) of the present disclosure, as embodied and broadly described herein, the disclosure, in one aspect, relates to metallocyclopropene compounds, methods of making same, methods for ring expansion metathesis polymerization, and polymers prepared by the methods for ring expansion metathesis polymerization.

Disclosed are metallocyclopropene complexes having a structure represented by a formula:

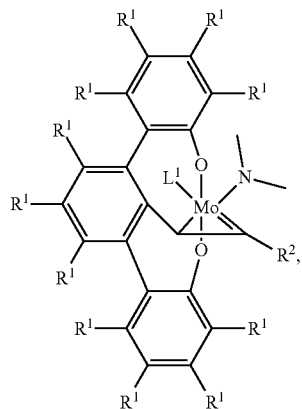

wherein each occurrence of $R^1$ is independently selected from H and C1-C6 alkyl, or two adjacent $R^1$ are linked to form a five- to eight-member cyclic group; $R^2$ is selected from $Ar^1$, C1-C22 alkyl, halo, C1-C22 haloalkyl, hydrogen, amino, alkoxy, ether, and $(R^3)_3$—Si—; each occurrence of $R^3$ is independently selected from C1-C22 alkyl, $Ar^1$, —O—(C1-C22 alkyl), —O—$Ar^1$, —N—(C1-C22 alkyl), or —N—$Ar^1$; $Ar^1$ is an aryl or heteroaryl group; and wherein $L^1$ is absent or selected from phosphine, amine, and five- or six-membered monocyclic groups containing 1 to 4 heteroatoms; provided that $R^2$ is not phenyl or $(CH_3)_3$—Si—.

Also disclosed are methods for preparing a disclosed metallocyclopropene complex, the method comprising providing a complex having a structure represented by a formula:

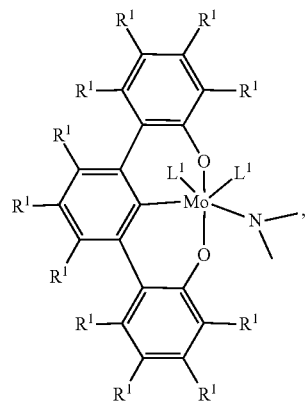

wherein each occurrence of $R^1$ is independently selected from H and C1-C6 alkyl, or two adjacent $R^1$ are linked to form a five- to eight-member cyclic group; and reacting with a terminal alkyne having a structure represented by a formula:

$$H\!\!\equiv\!\!\equiv\!\!-R^2,$$

wherein $R^2$ is selected from $Ar^1$, C1-C22 alkyl, halo, C1-C22 haloalkyl, hydrogen, amino, alkoxy, ether, and $(R^3)_3$—Si—; each occurrence of $R^3$ is independently selected from C1-C22 alkyl and $Ar^1$; $Ar^1$ is an aryl or heteroaryl group; and wherein each occurrence of $L^1$ is absent or independently selected from phosphine, phosphite, phosphinite, phosphonate, ether, thioether, amine, amide, imine, and five- or six-membered monocyclic groups containing 1 to 4 heteroatoms; provided that $R^2$ is not phenyl or $(CH_3)_3$—Si—; thereby yielding a disclosed metallocyclopropene complex.

Also disclosed are methods for ring expansion metathesis polymerization, the method comprising providing a disclosed metallocyclopropene complex; and reacting the disclosed metallocyclopropene complex with one or more cyclic alkenes.

Also disclosed are stereoregular cyclic polymers derived from cyclic olefins prepared using the disclosed metallocyclopropene complex. In some embodiments, the stereoregular cyclic polymers are stereoregular saturated cyclic polymers.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 1:
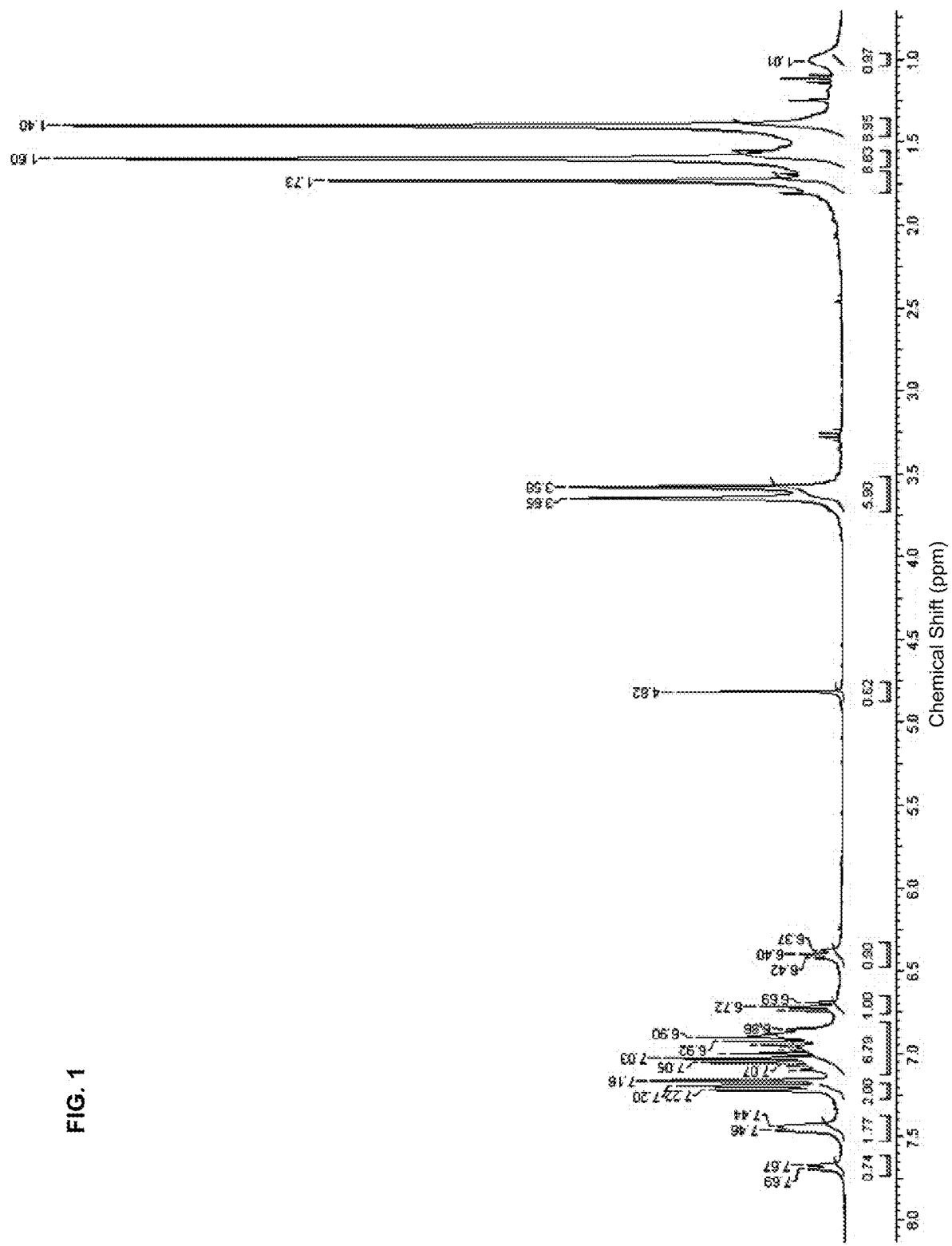
FIG. 1 shows the $^1$H NMR spectrum of metallocyclopropene 1 in $C_6D_6$.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The disclosures herein will be described more fully hereinafter with reference to the accompanying drawings, in which some, but not all possible embodiments are shown. Indeed, disclosures may be embodied in many different forms and should not be construed as limited to the embodiments set forth herein; rather, these embodiments are provided so that this disclosure will satisfy applicable legal requirements. Like numbers refer to like elements throughout.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

It is also to be understood that the terminology used herein is for the purpose of describing particular aspects only and is not intended to be limiting. As used in the specification and in the claims, the term "comprising" can include the aspect of "consisting of." Unless defined otherwise, all technical and scientific terms used herein have the same meaning as commonly understood by one of ordinary skill in the art to which the disclosed compositions and methods belong. In this specification and in the claims which follow, reference will be made to a number of terms which shall be defined herein.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Definitions

As used herein, the term "alkyl" refers to straight chained and branched saturated hydrocarbon groups containing one to thirty carbon atoms, for example, one to twenty carbon atoms, or one to ten carbon atoms. The term Cn means the alkyl group has "n" carbon atoms. For example, C4 alkyl refers to an alkyl group that has 4 carbon atoms. C1-C7alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Nonlimiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

As used herein, the term "cycloalkyl" refers to an aliphatic cyclic hydrocarbon group containing three to eight carbon atoms (e.g., 3, 4, 5, 6, 7, or 8 carbon atoms). The term Cn means the cycloalkyl group has "n" carbon atoms. For example, C5 cycloalkyl refers to a cycloalkyl group that has 5 carbon atoms in the ring. C5-8 cycloalkyl refers to cycloalkyl groups having a number of carbon atoms encompassing the entire range (i.e., 5 to 8 carbon atoms), as well as all subgroups (e.g., 5-6, 6-8, 7-8, 5-7, 5, 6, 7, and 8 carbon atoms). Nonlimiting examples of cycloalkyl groups include cyclopropyl, cyclobutyl, cyclopentyl, cyclohexyl, cycloheptyl, and cyclooctyl. Unless otherwise indicated, a cycloalkyl group can be an unsubstituted cycloalkyl group or a substituted cycloalkyl group. The cycloalkyl groups described herein can be isolated or fused to another cycloalkyl group, a heterocycloalkyl group, an aryl group and/or a heteroaryl group.

As used herein, the term "heterocycloalkyl" is defined similarly as cycloalkyl, except the ring contains one to three heteroatoms independently selected from oxygen, nitrogen, or sulfur. In particular, the term "heterocycloalkyl" refers to a ring containing a total of three to eight atoms, of which 1, 2, 3 or three of those atoms are heteroatoms independently selected from the group consisting of oxygen, nitrogen, and sulfur, and the remaining atoms in the ring are carbon atoms. Nonlimiting examples of heterocycloalkyl groups include piperdine, tetrahydrofuran, tetrahydropyran, dihydrofuran, morpholine, and the like. Heterocycloalkyl groups can be saturated or partially unsaturated ring systems optionally substituted with, for example, one to three groups, independently selected alkyl, alkylene, OH, C(O)NH$_2$, NH$_2$, oxo (=O), aryl, haloalkyl, halo, and OH. Heterocycloalkyl groups optionally can be further N-substituted with alkyl, hydroxyalkyl, alkylene-aryl, and alkylene-heteroaryl. The heterocycloalkyl groups described herein can be isolated or fused to another heterocycloalkyl group, a cycloalkyl group, an aryl group, and/or a heteroaryl group. When a heterocycloalkyl group is fused to another heterocycloalkyl group, then each of the heterocycloalkyl groups can contain three to eight total ring atoms, and one to three heteroatoms. In some embodiments, the heterocycloalkyl groups described herein comprise one oxygen ring atom (e.g., oxiranyl, oxetanyl, tetrahydrofuranyl, and tetrahydropyranyl).

As used herein, the term "aryl" refers to monocyclic or polycyclic (e.g., fused bicyclic and fused tricyclic) carbocyclic aromatic ring systems. Examples of aryl groups include, but are not limited to, phenyl, naphthyl, tetrahydronaphthyl, phenanthrenyl, biphenylenyl, indanyl, indenyl, anthracenyl, and fluorenyl. Unless otherwise indicated, an aryl group can be an unsubstituted aryl group or a substituted aryl group.

As used herein, the term "heteroaryl" refers to a cyclic aromatic ring having five to twelve total ring atoms (e.g., a monocyclic aromatic ring with 5-6 total ring atoms), and containing one to three heteroatoms selected from nitrogen, oxygen, and sulfur atom in the aromatic ring. Unless otherwise indicated, a heteroaryl group can be unsubstituted or substituted with one or more, and in particular one to four, substituents selected from, for example, halo, alkyl, alkenyl, OCF$_3$, NO$_2$, CN, NC, OH, alkoxy, amino, CO$_2$H, CO$_2$alkyl, aryl, and heteroaryl. In some cases, the heteroaryl group is substituted with one or more of alkyl and alkoxy groups. Heteroaryl groups can be isolated (e.g., pyridyl) or fused to another heteroaryl group (e.g., purinyl), a cycloalkyl group (e.g., tetrahydroquinolinyl), a heterocycloalkyl group (e.g., dihydronaphthyridinyl), and/or an aryl group (e.g., benzothiazolyl and quinolyl). Examples of heteroaryl groups include, but are not limited to, thienyl, furyl, pyridyl, pyrrolyl, oxazolyl, quinolyl, thiophenyl, isoquinolyl, indolyl, triazinyl, triazolyl, isothiazolyl, isoxazolyl, imidazolyl, benzothiazolyl, pyrazinyl, pyrimidinyl, thiazolyl, and thiadiazolyl. When a heteroaryl group is fused to another heteroaryl group, then each ring can contain five or six total ring atoms and one to three heteroatoms in its aromatic ring.

As used herein, the term "cyclic group" encompasses cycloalkyl groups, heterocycloalkyl groups, aryl groups, and heteroaryl groups. Cyclic groups can be monocyclic or polycyclic. The cyclic group can have five to twelve "member(s)" which refers to the total ring atoms. For example, a five-member cyclic group refers to a cyclic group having 5 atoms in the ring. Five- to eight-member cyclic group refers to a cyclic group having a number of ring atoms encompassing the entire range (i.e., 5 to 8 atoms) as well as all subgroups (e.g., 5-6, 6-8, 7-8, 5-7, 5, 6, 7, or 8 atoms).

As used herein, the term "hydroxy" or "hydroxyl" as used herein refers to the "—OH" group.

As used herein, the term "alkoxy" or "alkoxyl" refers to a "—O-alkyl" group. As used herein, the term "aryloxy" or "aryloxyl" refers to a "—O-aryl" group.

As used herein, the term "halo" is defined as fluoro, chloro, bromo, and iodo. The term "haloalkyl" refers to an alkyl group that is substituted with at least one halogen.

As used herein, the term "carboxy" or "carboxyl" refers to a "—COOH" group.

As used herein, the term "amino" refers to a —NH$_2$ or —NH— group, wherein any hydrogen can be replaced with an alkyl, cycloalkyl, or aryl group. As used herein, the term "amido" refers to an amino group that is substituted with a carbonyl moiety (e.g., —NRC(=O)O— or —OC(↑O)—NR—), wherein R is a substituent on the nitrogen (e.g., alkyl or H).

As used herein, the term "ester" refers to a —RC(=O)OR— group, wherein one R is a substituent on the carbon (e.g., alkyl or aryl), and one R is a substituent on the oxygen (e.g., alkyl or aryl). As used herein, the term "ether" refers to a —ROR— group, wherein both R are substituents on the oxygen (e.g., alkyl or aryl).

As used herein, the term "substituted," when used to modify a chemical functional group, refers to the replacement of at least one hydrogen radical on the functional group with a substituent. Substituents can include, but are not limited to, alkyl, cycloalkyl, alkenyl, cycloalkenyl, alkynyl, heterocycloalkyl, ether, polyether, thioether, polythioether, aryl, heteroaryl, hydroxyl, oxy, alkoxy, heteroalkoxy, aryloxy, heteroaryloxy, ester, thioester, carboxy, cyano, nitro, amino, amido, acetamide, and halo (e.g., fluoro, chloro, bromo, or iodo). When a chemical functional group includes more than one substituent, the substituents can be bound to the same carbon atom or to two or more different carbon atoms.

Disclosed are metallocyclopropene complexes having a structure represented by a formula:

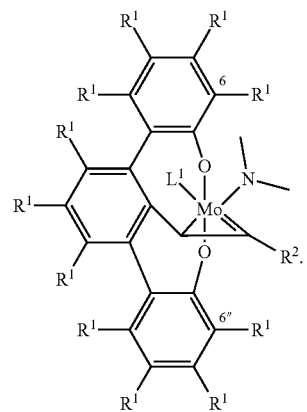

Generally, each occurrence of $R^1$ independently can be H or substituted with an alkyl group such as methyl, ethyl, n-propyl, i-propyl, n-butyl, i-butyl, t-butyl, or larger alkyl group, for example C5 to C20 alkyl. In some embodiments, $R^1$ can be selected from C1 to C6 alkyl. In some embodiments, two adjacent $R^1$ can be linked to form a five- to eight-member cyclic group, for example, cyclopentane, cyclohexane, cycloheptane, cyclooctane, cyclopentene, cyclopentadiene, cyclohexene, cyclohexadiene, cyclohexatriene (benzene), cycloheptene, cycloheptadiene, cycloheptatriene, cyclooctene, cyclooctadiene, cyclooctatriene, and cyclooctatetraene (annulene). In embodiments wherein two adjacent $R^1$ are linked to form a five- to eight-member cyclic group, one or more of the atoms of the cyclic group, e.g., 1 to 4 or 1 to 3 atoms, can be a heteroatom selected from oxygen, nitrogen, and sulfur.

In embodiments, $R^1$ can individually be selected from H, C1 to 20 alkyl, carboxylic acid, carboxylic ester, amine, thiol, epoxy, halo, haloalkyl, hydroxy, or two adjacent $R^1$ can be linked to form a five- to eight-member cyclic group. In embodiments, no $R^1$ comprises a carboxylic acid, carboxylic ester, thiol, epoxy or hydroxy. Without intending to be bound by theory, it is believed that large $R^1$ groups at carbons 6, 4', 6', 6" of the ligand can force the aromatic rings of the ligand to be out of plane to a significant degree and thereby inhibit the formation of the ligand-metal complex. In some embodiments, each $R^1$ is independently selected from H, methyl, ethyl, propyl, butyl, pentyl, and hexyl. In some embodiments, each $R^1$ is independently selected from H, i-butyl; n-butyl; s-butyl; and t-butyl. In some embodiments, the $R^1$ groups at carbons 6 and 6" of the ligand are each t-butyl and the remaining R' are each H.

$R^2$ is generally selected from $Ar^1$, C1-C22 alkyl, halo, C1-C22 haloalkyl, hydrogen, amino, C1-C22 alkoxy, C1-C22 ether, and $(R^3)_3$—Si—, provided that $R^2$ is not phenyl or $(CH_3)_3$—Si—. In general, $Ar^1$ is an aryl or heteroaryl group, including, but not limited to, pyrrolyl, furanyl, thiophenyl, imidazolyl, pyrazolyl, oxazolyl, isoxazolyl, thiazolyl, phenyl, pyridinyl, pyrazinyl, pyrimidinyl, pyridazinyl, or triazinyl. $Ar^1$ can also be a fused aryl or heteroaryl group, including, but not limited to, benzofuranyl, isobenzofuranyl, indolyl, isoindolyl, benzothiophenyl, bensimidazolyl, purinyl, indazolyl, benzoxazolyl, benzisoxazolyl, benzothiazolyl, maphthalenyl, anthracenyl, quinolinyl, isoquinolinyl, quinoxalinyl, acridinyl, quinazolinyl, cinnolinyl, and phthalazinyl.

When $R^2$ is C1-C22 alkyl, haloalkyl, alkoxy, or ether, the alkyl chain can be straight or branched. The alkyl chain can optionally further be substituted by, for example, $Ar^1$, halo, amino, alkoxy, ether, and $(R^3)_3$—Si—. In embodiments, $R^2$ is tert-butyl.

Suitable amino groups for $R^2$ include, but are not limited to, dihydrogen amino and C1-C4 dialkyl amino, wherein each alkyl group can be the same (e.g., dimethyl amino, diethyl amino, dipropyl amino, dibutyl amino), or different (e.g., methylethyl amino, methylpropyl amino, methylbutyl amino, ethylpropyl amino, ethylbutyl amino, and propylbutyl amino).

$R^2$ can generally be an electron withdrawing substituent or electron donating substituent. Without intending to be bound by theory, it is believed that the electron withdrawing or donating abilities of $R^2$ can affect the rate of the initiation and propagation of polymerization, for example, under otherwise identical reaction conditions, as the electron donating ability of $R^2$ increases, the rates generally increase, whereas as the electron donating ability of $R^2$ decreases (and electron withdrawing ability increases), the rates generally decrease. Similarly, without intending to be bound by theory, it is believed that the rate of initiation is influenced by the presence or absence of a heteroatom adjacent to the carbon-carbon triple bond of the alkyne used to prepare the metallocyclopropene complex. Further still, without intending to be bound by theory, it is believed that the rate of initiation and propagation of polymerization will be influenced by the steric properties of $R^2$, for example, as $R^2$ becomes increasingly sterically bulky, $R^2$ will hinder the approach of the cyclic monomer to the metal center.

In some embodiments, $R^2$ is selected from methyl, ethyl, propyl, butyl, pentyl, hexyl, naphthyl, and C7-C22 aryl. In some embodiments, $R^2$ is selected from i-butyl; n-butyl; s-butyl; and t-butyl. In some embodiments, $R^2$ is $Ar^1$; and wherein $Ar^1$ is selected from naphthyl and C7-C22 aryl.

Each occurrence of $R^3$ is independently selected from C1-C22 alkyl, $Ar^1$, —O—(C1-C22 alkyl), —O—$Ar^1$, —N—(C1-C22 alkyl), or —N—$Ar^1$, as defined herein; provided that $R^2$ is not phenyl or $(CH_3)_3$—Si—.

$L^1$ can be absent or a weakly coordinating electron donor ligand, including, but not limited to, phosphine, phosphite, phosphinite, phosphonate, ether, thioether, amine, amide, imine, and five- or six-membered monocyclic groups containing 1 to 4 heteroatoms. The five- or six-membered monocyclic groups can include 1 to 4 heteroatoms, 1 to 3 heteroatom, or 1 to 2 heteroatoms, for example, pyridine, pyridazine, pyrimidine, pyrazine, triazine, pyrrole, pyrazole, imidazoletriazole, pyran, pyrone, dioxin, and furan. The five- or six-membered monocyclic groups can be substituted with halo, C1-C20 alkyl, substituted C1-C20 alkyl, C1-C20 heteroalkyl, substituted C1-C20 heteroalkyl, C5-C24 aryl, substituted C2-C24 aryl, C5-C24 heteroaryl, substituted C5-C24 heteroaryl, C6-C24 alkaryl, substituted C6-C24 alkaryl, C6-C24 heteroalkaryl, substituted C6-C24 heteroalkaryl, C6-C24 aralkyl, substituted C6-C24 aralkyl, C6-C24 heteroaralkyl, substituted C6-C24 heteroaralkyl, and functional groups, including but not limited to, C1-C20 alkoxy, C5-C24 aryloxy, C2-C20 alkylcarbonyl, C6-C24 arylcarbonyl, carboxy, carboxylate, carbamoyl, carbamido, formyl, thioformyl, amino, nitro, and nitroso. Phosphine and amine ligands can include primary, secondary, and tertiary phosphines and amines. The phosphine and amine ligands can include 0 to 3 alkyl groups, 1 to 3 alkyl groups, or 1 to 2 alkyl groups selected from C1-C20 alkyl. The phosphine and amine ligands can also include 0 to 3 aryl or heteroaryl groups, 1 to 3 aryl or heteroaryl groups, or 1 to 2 aryl or heteroaryl groups selected from five- and six-membered aryl or heteroaryl rings.

In embodiments, $L^1$ comprises amine, phosphine, or pyridine. In embodiments, $L^1$ comprises dimethylamine, diethylamine, or dipropylamine. In some embodiments, $L^1$ is absent. In embodiments wherein $L^1$ is absent, the metallocyclopropene complex is coordinatively unsaturated. In some embodiments, when $R^2$ is tert-butyl, $L^1$ is absent.

Without intending to be bound by theory, it is believed that the presence or absence of $L^1$ in the metallocyclopropene complex depends on a combination of steric and electronic effects based on the identity of $L^1$ and $R^2$. Further, without intending to be bound by theory, it is believed that the electronic effect has a strong influence on the presence or absence of $L^1$ in the metallocyclopropene complex than steric effects. For example, without intending to be bound by theory, when $R^2$ is alkyl, it is believed that the =C—$R^2$ group exerts a strong trans influence on the ligand trans to the double bond, resulting in an elongated or absent $L^1$-Mo bond. Thus, it is believed that when $L^1$ of the starting metal complex is weakly coordinating ligand, e.g., $NR_3$, and =C—$R^2$ exerts a strong trans influence, $L^1$ is absent from the metallocyclopropene complex, providing a coordinatively unsaturated metallocyclopropene complex. As another example, without intending to be bound by theory, it is believed that when $R^2$ comprises a bulky aromatic group, the bulky aromatic group can increase crowding of one or both weakly coordinating ligands, $L^1$, provided on the starting metal complex such that one or both $L^1$ dissociate from the metal center, proving a coordinatively unsaturated metallocyclopropene complex.

In some embodiments the metallocyclopropene complex has a structure represented by the formula:

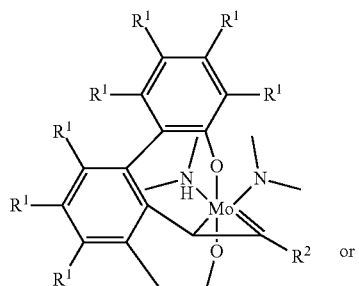

or

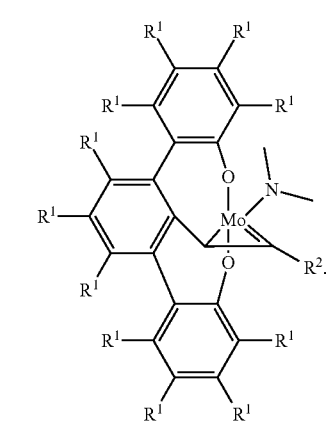

In some embodiments, the metallocyclopropene complex has a structure represented by the formula:

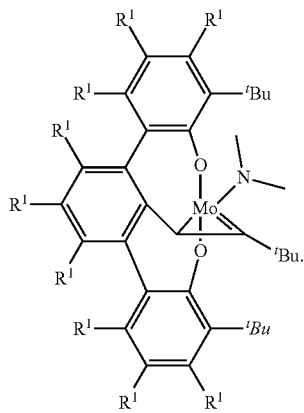

In some embodiments, the metallocyclopropene complex has a structure represented by the formula:

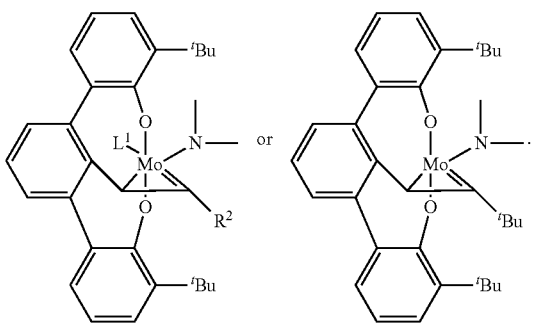

Also disclosed are methods for preparing a disclosed metallocyclopropene complex, the method comprising providing a complex having a structure represented by a formula:

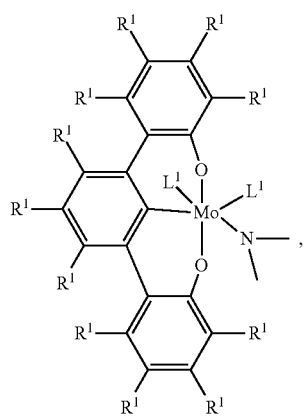

wherein each occurrence of $R^1$, and $L^1$ are selected as previously disclosed herein or both $L^1$ together comprise a bidentate ligand; and reacting with a terminal alkyne having a structure represented by a formula:

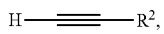

wherein R² is selected as previously disclosed herein; thereby yielding a disclosed metallocyclopropene complex.

In some embodiments, each occurrence of R¹ is independently selected from H, methyl, ethyl, propyl, butyl, pentyl, and hexyl. In some embodiments, R¹ is independently selected from H, i-butyl; n-butyl; s-butyl; and t-butyl.

In embodiments wherein both L¹ together comprise a bidentate ligand, the bidentate ligand can include, but is not limited to, bipyridine, ethylenediamine, diaminocyclohexane, acetylacetonate, oxalate, and phenanthroline.

In some embodiments, R² is selected from methyl, ethyl, propyl, butyl, pentyl, hexyl, naphthyl, and C7-C22 aryl. In some embodiments, R² is selected from i-butyl; n-butyl; s-butyl; and t-butyl. In some embodiments, R² is Ar¹; and wherein Ar¹ is selected from naphthyl and C7-C22 aryl.

In some embodiments, each occurrence of R¹ is independently selected from H an dC1-C6 alkyl, each occurrence of L¹ is selected from phosphine, amine, or five- or six-membered monocyclic groups containing 1 to 4 heteroatoms or both L¹ together comprise a bidentate ligand, and R² is selected from Ar¹, C1-C22 alkyl, and (R₃')₃—Si—, wherein each occurrence of R³ is independently selected from C1-C22 alkyl or Ar¹ and Ar¹ is an aryl or heteroaryl, provided that R² is not phenyl or (CH₃)₃—Si—.

In some embodiments, the method comprises providing a complex having a structure represented by a formula:

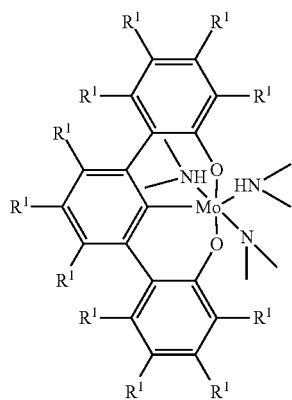

wherein each occurrence of R¹ is selected as previously disclosed herein; and reacting with a terminal alkyne having a structure represented by a formula:

wherein R² is selected as previously disclosed herein; thereby yielding a disclosed metallocyclopropene complex.

In some embodiments, the method comprises providing a complex having a structure represented by a formula:

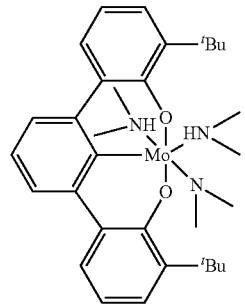

and reacting with a terminal alkyne having a structure represented by a formula:

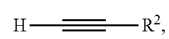

wherein R² is selected as previously disclosed herein; thereby yielding a disclosed metallocyclopropene complex.

Also disclosed is a method of preparing a cyclic polymer by ring expansion metathesis polymerization, the method comprising providing a metallocyclopropene complex of the disclosure and reacting the metallocyclopropene complex with one or more cyclic alkenes.

In some embodiments, the metallocyclopropene complex has a structure

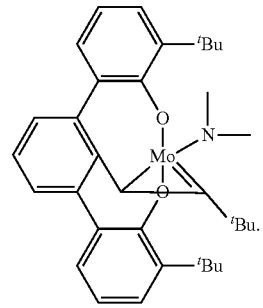

Cyclic polymers can be prepared from a wide variety of cycloalkene monomers, including, but not limited to, monocyclic alkenes, such as, but not limited to cyclopropene, cyclobutene, cyclopentene, cycloheptene, and cyclooctene, and substituted variations thereof, bicycloalkenes, such as, but not limited to, norbornene, dicyclopentadiene, norbornene anhydride, an ester of norbornene anhydride, an imide of norbornene anhydride, oxanorbornene, oxanorbornene anhydride, an ester of oxanorbornene anhydride, an imide of oxanorbornene anhydride, and substituted variations of the foregoing. The imides can be imides from alkyl or aryl amines, which can be substituted or unsubstituted. Substituents can be C1-C10 alkyl, aryl, alkoxy, carboxylic acid ester, carboxylic acid amide, where the amide is optionally substituted one or two times with an alkyl or aryl. Cyclic polymers can be prepared that are copolymers of two or more monomers. In embodiments, the cyclic alkene can comprise one or more of cyclopropene, cyclobutene, cyclopentene, cycloheptene, cyclooctene, norbornene, dicyclopentadiene, norbornene anhydride, an ester of norbornene anhydride, an imide of norbornene anhydride, oxanorbornene, oxanorbornene anhydride, an ester of oxanorbornene anhydride, an imide of oxanorbornene anhydride, and substituted variations of the foregoing. In embodiments, the cyclic alkene can comprise a substituted cyclic alkene and the substitution is not a carboxyl, a carbonyl, an alcohol, or a thiol. In embodiments, the cyclic alkene can comprise a substituted cyclic alkene and the substitution comprises an alkyl group or an aryl group. In embodiments, the cyclic polymer comprises a homopolymer. In embodiments, the cyclic polymer comprises a copolymer of two or more cyclic alkene monomers.

The molecular weight of the cyclic polymers can be small, equivalent to oligomers of three to ten repeating units, or the molecular weights can be of any size up to tens and hundreds of thousands or millions in molecular weight, for example, in a range of about 200 Da to about 5,000,000 Da, about 500 Da to about 4,000,000 Da, about 1,000 Da to about 3,000,000 Da, about 5,000 Da to about 2,000,000 Da or about 10,000 to about 1,000,000 Da. The cyclic poly(cycloalkene)s can be used as prepared or converted into cyclic poly(cycloalkane)s upon reduction of the double bonds of the cyclic poly(cycloalkene)s polymer. The cyclic poly(cycloalkene)s can be converted to substituted cyclic poly(cycloalkane)s by addition reaction at the alkene groups of the cyclic poly(cycloalkene)s, for example the addition of halogens, alcohols, amines, or any other olefin addition reactions.

Polymerization is initiated by combining the metallocyclopropene complex with the cycloalkane monomer in bulk or in solution, at a temperature in the range of about 30° C. to about 100° C. or greater, for example, in a range of about 35° C. to about 85° C. or about 40° C. to about 60° C. The progress of the reaction can be monitored by standard techniques, e.g., nuclear magnetic resonance spectroscopy.

Examples of solvents that may be used in the polymerization reaction include organic, protic, or aqueous solvents that are inert under the polymerization conditions, such as aromatic hydrocarbons, halogenated hydrocarbons, ethers, aliphatic hydrocarbons, alcohols, water, or mixtures thereof. Suitable halogenated hydrocarbon solvents include methylene chloride, chloroform, chlorobenzene, 1,2-dichloroethane, dichlorobenzene, and mixtures thereof.

Polymerization can be carried out in a drybox under an inert atmosphere. Polymerization times will vary, depending on the particular monomer, metallocyclopropene complex, and desired molecular weight of the cyclic polymer product. A representative polymerization reaction using norbornene as the sole monomer is illustrated in reaction schemes 2.1 and 2.2. As illustrated, polymerization proceeds by successive addition/insertion of the monomer to the growing macrocycle on the metal complex, and the intermediate macrocylic complex undergoes intramolecular chain transfer to yield the cyclic olefinic polymer. Polymerization may be terminated at any time by addition of a solvent effective to precipitate the polymer.

The precipitated polymer may then be isolated by filtration or other conventional means. Polymers having high degrees of stereoregularity can be prepared. The present process has enabled preparation of cyclic polynorbornene having greater than 90%, greater than 92%, greater than 95%, greater than 98%, or greater than 99% stereoregularity.

Following polymer synthesis and recovery, the olefinic polymer provided may be hydrogenated using conventional means, e.g., via standard $H_2$/Pd/C procedures or via tosylhydrazine decomposition. Generally, either procedure will result in a saturated polymer having hydrogenated more than 99% of the olefinic functionalities in the polymer backbone, as may be determined by $^1$H and $^{13}$C NMR spectroscopy. Advantageously, the stereoregularity of the polymers are maintained during hydrogenation, providing for stereoregular saturated cyclic polymers.

The stereoregular saturated cyclic polymer can have a structure:

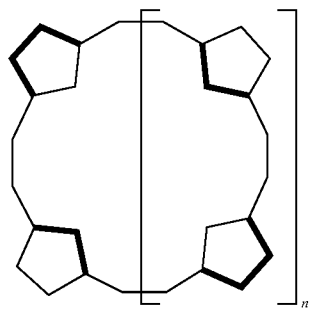

wherein n is a positive integer. In embodiments, n can be in a range of 1 to 20,000, for example 1 to 19,000, 1 to 18,000, 1 to 17,000, 1 to 16,000, 1 to 15,000, 1 to 14,000, 1 to 13,000, 1 to 12,000 1 to 11,000, 1 to 10,000, 1 to 8000, 1 to 6000, 1 to 5000, 1 to 4000, 1 to 2000, 1 to 1000, 1 to 900, 1 to 800, 1 to 700, 1 to 600, 1 to 500, 1 to 400, 1 to 300, 1 to 200, 1 to 250, 1 to 100, 1 to 50, 50 to 20,000, 50 to 15,000, 50 to 10,000, 100 to 20,000, 100 to 15,000, 100 to 10,000, 500 to 20,000, 500 to 15,000, 500 to 10,000, 1000 to 20,000, 1000 to 15,000, or 1000 to 10,000.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

Prior to describing the various embodiments, the following definitions are provided and should be used unless otherwise indicated.

EXAMPLES

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Synthetic Scheme Introduction. The synthesis of the trianionic pincer amido-amine complex A has been previously reported (Jan, M. T., et al., J. Organomet. Chem. 2011 696:4079-4089). Treating complex A with one equivalent of terminal alkynes $R^2$—C≡C—H (e.g., $R^2$=Ph, $Me_3Si$, and $^tBu$) leads to formation of the corresponding metallocyclopropenes 1, 2, and 3, having the structures shown herein below and prepared according to Reaction Scheme 1 shown below. The metallocyclopropene or metallocyclopropylidene forms whether the $R^2$ is an electron withdrawing substituent ($R^2$=Ph) or electron donating substituent ($R^2$=$SiMe_3$ or $^tBu$). It has been reported (Nadif, S. S., et al.

J. Am. Chem. Soc. 2016, 138, 6408-6411; and Gonsales, S. A., et al., J. Am. Chem. Soc. 2016, 138, 4496-4999) that tethered alkylidenes can be utilized for ring expansion metathesis polymerization (REMP, Scheme 2). The disclosed compounds, such as complex 3, was tested for polymerization activity with norbornene according to Reaction Schemes 2.1 and 2.2 shown below. The data indicate the polymer is highly cis enriched >99% and highly tactic.

General considerations. Unless specified otherwise, all manipulations were performed under an inert atmosphere using standard Schlenk or glovebox techniques. Glassware was oven dried before use. Pentane, toluene, diethyl ether ($Et_2O$), tetrahydrofuran (THF), and 1,2-dimethoxyethane (DME) were dried using a Glass Contours drying column. Benzene-d6 (Cambridge Isotopes) was dried over sodium-benzophenone ketyl or calcium hydride ($CaH_2$), and distilled or vacuum transferred and stored over 3 or 4 Å molecular sieves. Complex [tBuOCO]Mo($NMe_2$)($NHMe_2$)$_2$ (2) and [tBuOCO]$H_3$ (1) were prepared according to published literature procedures (see below for structures; published procedure: Jan, M. T., et al., J. Organomet. Chem. 2011 696:4079-4089). Partially brominated poly(NBE) was synthesized according to known procedures. All alkynes were purified by passing through neutral alumina, an anhydrous magnesium sulfate packed column and degassed by three cycles of freeze-pump-thaw prior to use. NMR spectra were obtained on Varian Mercury Broad Band 300 MHz, Varian Mercury 300 MHz, or on Varian Inova 500 MHz spectrometers. Chemical shifts are reported in δ (ppm). For $^1H$ and $^{13}C\{^1H\}$ NMR spectra the solvent resonance was referenced as an internal reference. 19F and $^{31}P\{^1H\}$ NMR spectra were referenced externally to fluorobenzene and 85% $H_3PO_4$, respectively. Elemental analyses were performed at Complete Analysis Laboratory Inc., Parsippany, N. J. FT-IR spectra were recorded on a Thermoscientific instrument using KBr salt plates. The chemical shift assignments are primarily based on the cross-peaks observed in the $^1H$—$^{13}C$ gHMBC and gHSQC spectra. The spectra were recorded at 25° C. unless noted otherwise. Size-exclusion chromatography was performed in THF at 35° C. and a flow rate of 1.0 mL/min (Agilent isocratic pump, degasser, and autosampler; columns: three PLgel 5 μm MIXED-D mixed bed columns, molecular weight range 200-400,000 g/mol). Detection consisted of a Wyatt Optilab rEX refractive index detector operating at 658 nm, a Wyatt miniDAWN Treos light scattering detector operating at 656 nm, and a Wyatt ViscoStar-II viscometer. Absolute molecular weights and molecular weight distributions were calculated using the Wyatt ASTRA software.

General synthesis of metallocyclopropenes (1, 2 and 3). The following method was employed for the synthesis of 1, 2 and 3, the details for the synthesis of 1 are presented as a representative example. The structures of 1, 2 and 3 are as follows:

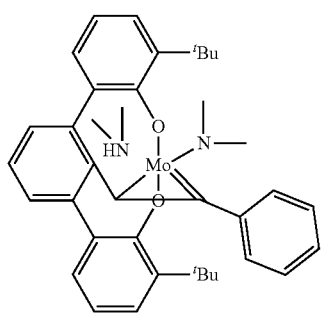

(1)

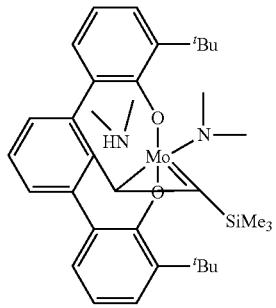

(2)

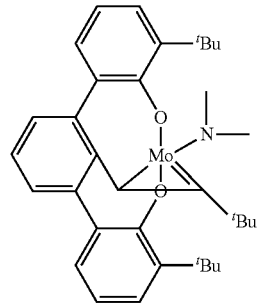

(3)

According the following reaction scheme:

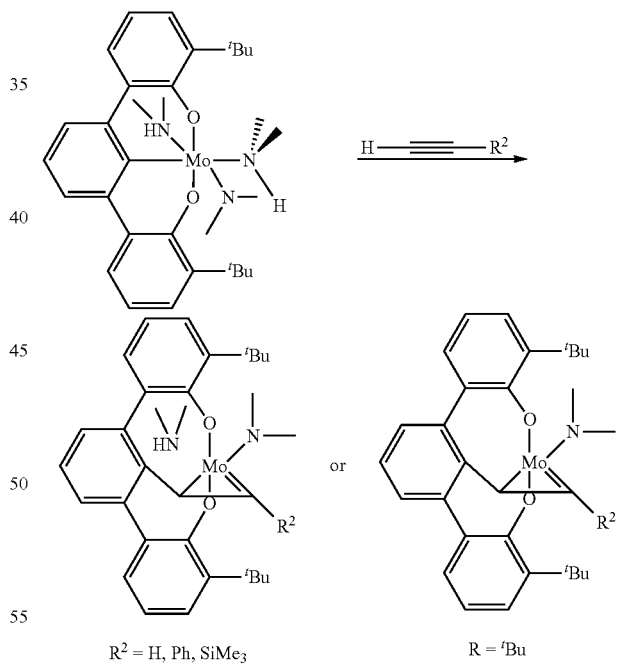

A glass vial was charged with [tBuOCO]Mo($NMe_2$) ($NHMe_2$)$_2$ (200 mg, 0.332 mmol) and 2 mL of benzene. PhC≡CH (36.5 μL, 0.332 mmol) was added to the stirring solution of [tBuOCO]Mo($NMe_2$)($NHMe_2$)$_2$ at 23° C. and the mixture was stirred for 3 h at 23° C. Insoluble materials were removed by filtration through a thin layer of Celite® and the filtrate was evaporated in vacuo to obtain a solid which was triturated with pentanes (3×1 mL). Redissolving the complex in pentanes and filtering to remove any remaining insoluble materials followed by solvent removal provides analytically pure reddish-orange 1 (180 mg, 82%). Crystals of 1 amenable to X-ray diffraction were grown from a concentrated solution of 1 in Et$_2$O solvent at −35° C.

Figure 2:
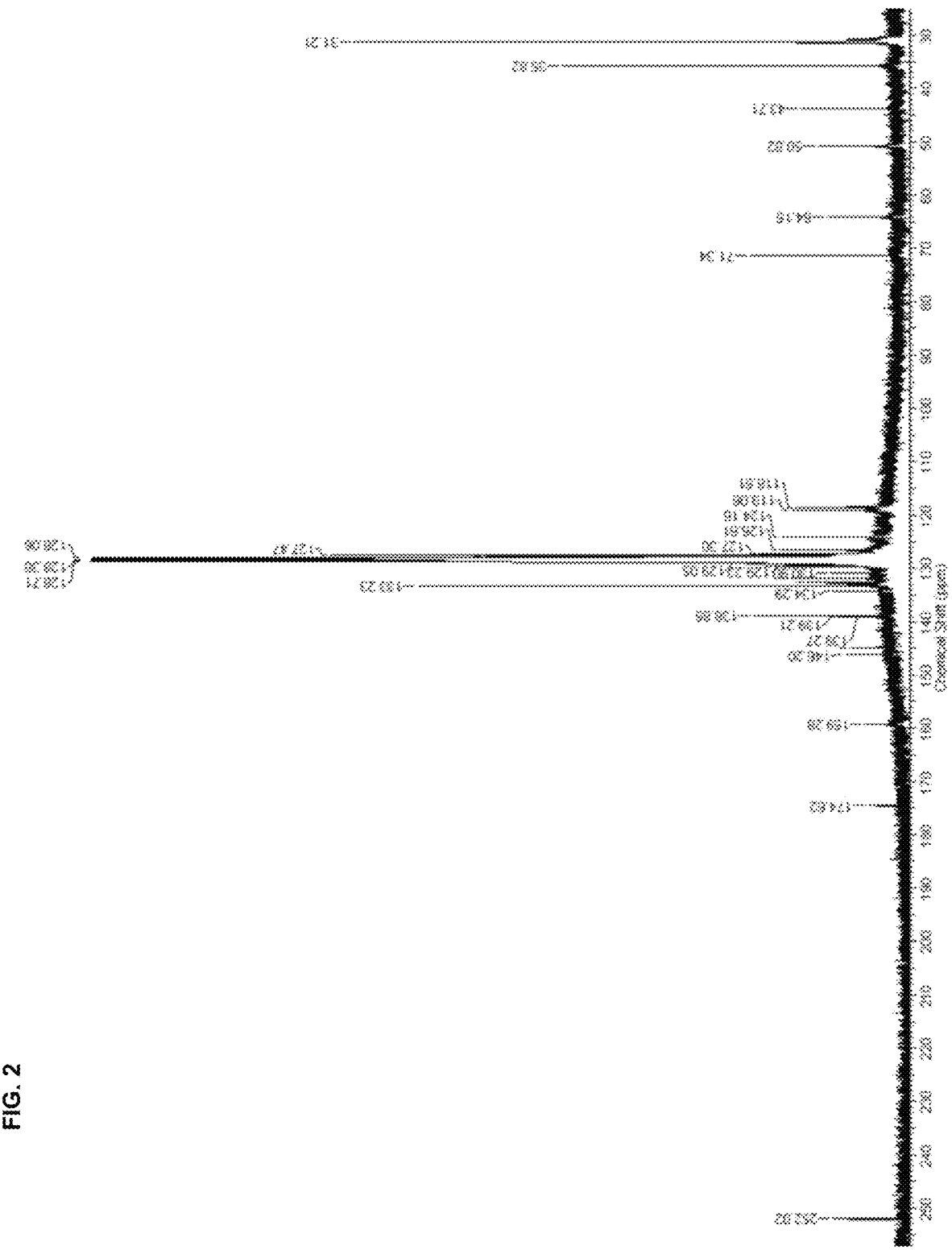
FIG. 2 shows the proton-decoupled $^{13}$C NMR spectrum of metallocyclopropene 1 in $C_6D_6$.
Figure 3:
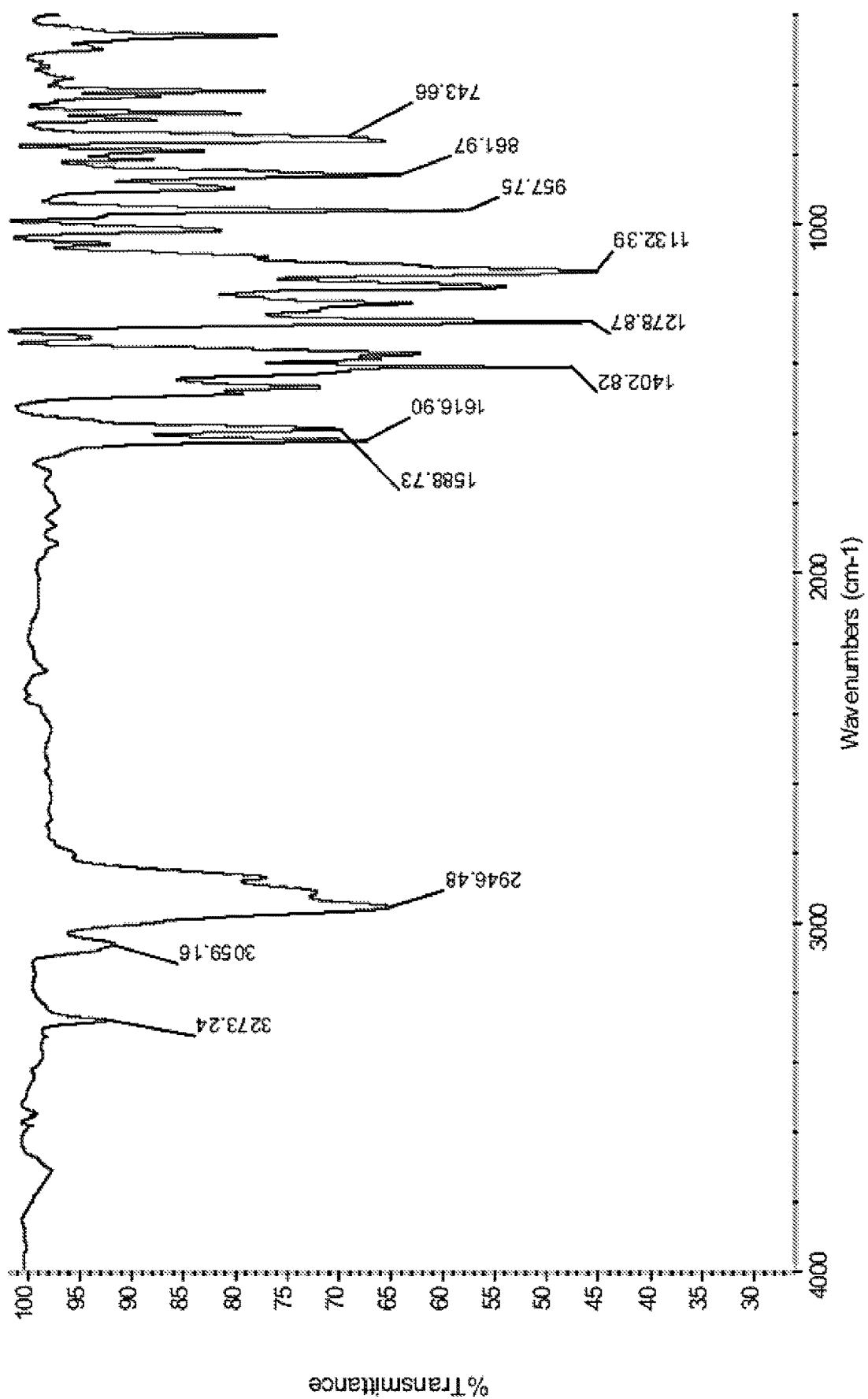
FIG. 3 shows the IR spectrum of metallocyclopropene 1 on KBr disc.

As shown in FIG. 1 and FIG. 2, the characterization data for 1: red-orange solid, yield 82%. $^1$H NMR (300 MHz, C6D6), δ (ppm): 7.68 (d, J=7.0 Hz, 1H, Ar—H), 7.45 (d, J=7.0, 2H, Ar—H), 7.21 (d, J=8.3 Hz, 2H, Ar—H), 6.86-7.10 (m, 7H, Ar—H), 6.72 (t, J=7.3, 1H, Ar—H), 6.40 (m, 1H, Ar—H), 4.82 (s, 1H, Mo—CH), 3.65 (s, 3H, N—CH$_3$), 3.58 (s, 3H, N—CH$_3$), 1.73 (s, 6H, NH—CH3), 1.60 (s, 9H, —C(CH3)3), 1.40 (s, 9H, —C(CH$_3$)$_3$). $^{13}$C{$^1$H} NMR (75.36 Hz, C$_6$D$_6$), δ (ppm): 252.0 (s, Mo=C), 174.6, 163, 159.3, 146.2, 144.8, 139.2, 138.9, 134.3, 133.2, 132.7, 132.0, 130.9, 129.6, 129.1, 128.2, 127.9, 127.8, 127.5, 127.3, 126.6, 124.2, 119.1, 118.5, 73.1 (s, Mo—CH, 64.2 (s, N—CH$_3$), 50.8 (s, N—CH3), 43.7 (s, NH—CH$_3$), 35.8 (s, —C(CH$_3$)$_3$), 31.2 (s, —C(CH$_3$)$_3$). Anal. Calcd. for C$_{38}$H$_{46}$MoN$_2$O$_2$: C, 69.28; H, 7.04; N, 4.25. Found: C, 69.19; H, 6.98; N, 4.07. FIG. 3 shows the IR spectrum of 1 on a KBR disc.

Figure 14:
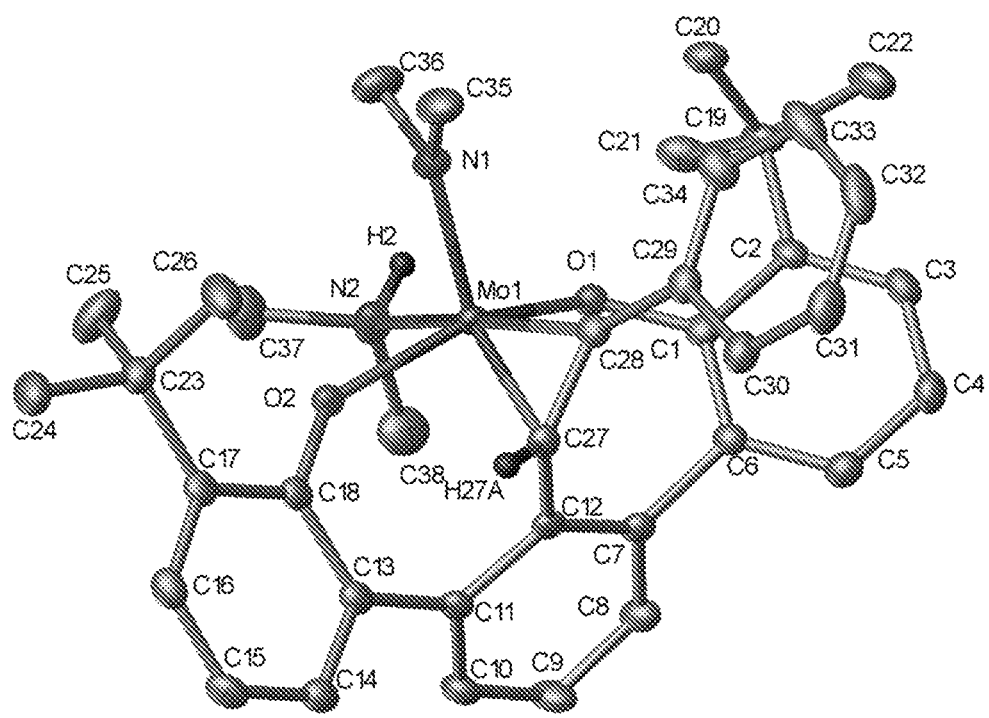
FIG. 14 shows the molecular structure of metallocyclopropene 1 with hydrogen atoms omitted for clarity.

X-ray experimental data for 1 was collected at 100 K on a Bruker DUO system equipped with an APEX II area detector and a graphite monochromator utilizing MoK$_α$ radiation (λ=0.71073 Å). Cell parameters were refined using up to 9999 reflections. A hemisphere of data was collected using the w-scan method (0.5° frame width). Absorption corrections by integration were applied based on measured indexed crystal faces. The structure was solve by the Direct Methods in SHELXTL6, and refined using full-matrix least squares. The non-H atoms were treated anisotropically, whereas the hydrogen atoms were calculated in idea positions and were riding on their respective carbon atoms. The protons on N2 and C27 were obtained from a Difference Fourier map and refined freely. A total of 406 parameters were refined in the final cycle of refinement using 5703 reflections with I>2σ(I) to yield R$_1$ and wR$_2$ of 2.86% and 7.19%, respectively. Refinement was done using F$^2$. The molecular structure of 1 with hydrogen atoms omitted for clarity is shown in FIG. 14.

Figure 4:
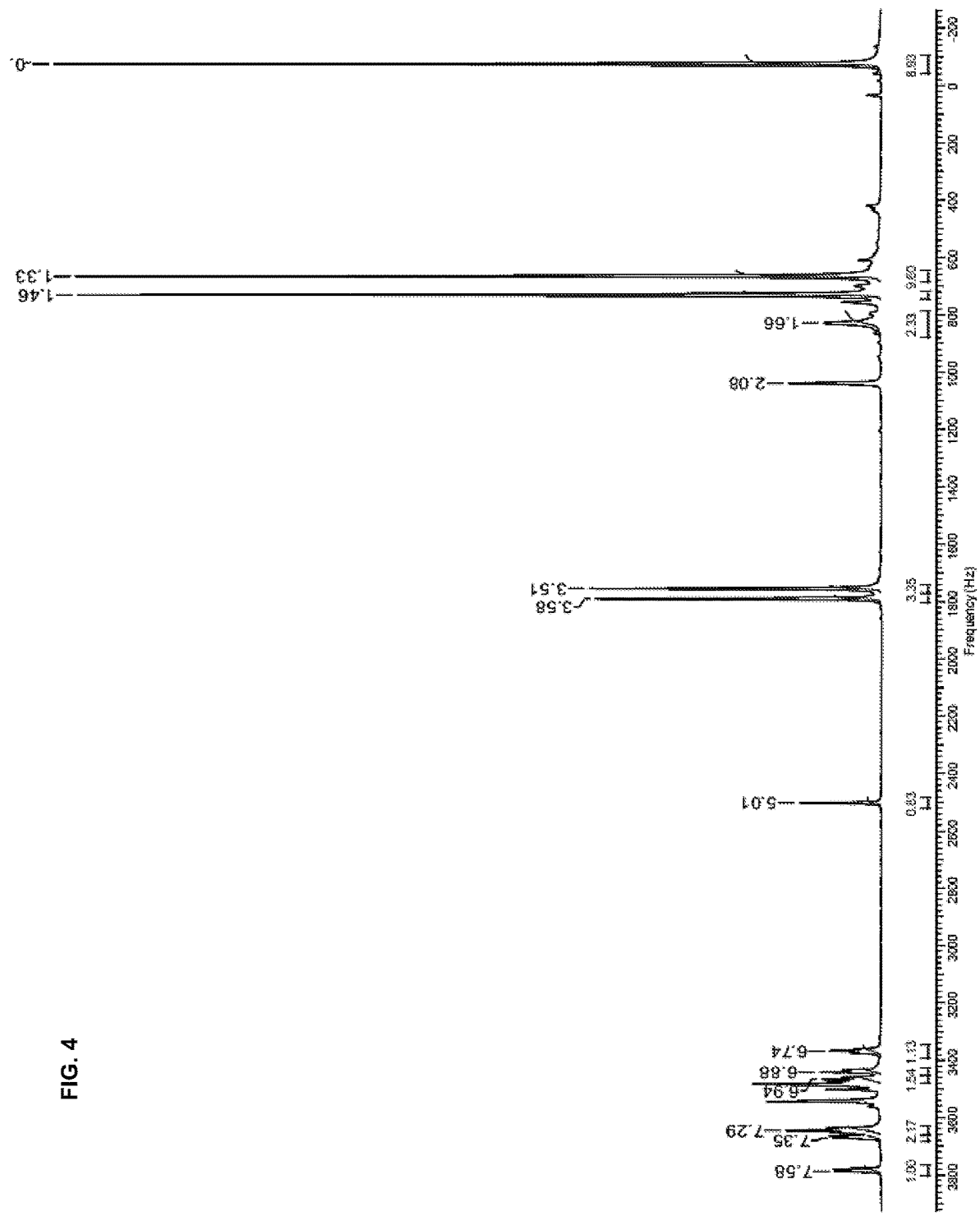
FIG. 4 shows the $^1$H NMR spectrum of metallocyclopropene 2 in toluene-$d_8$ at 25° C.
Figure 5:
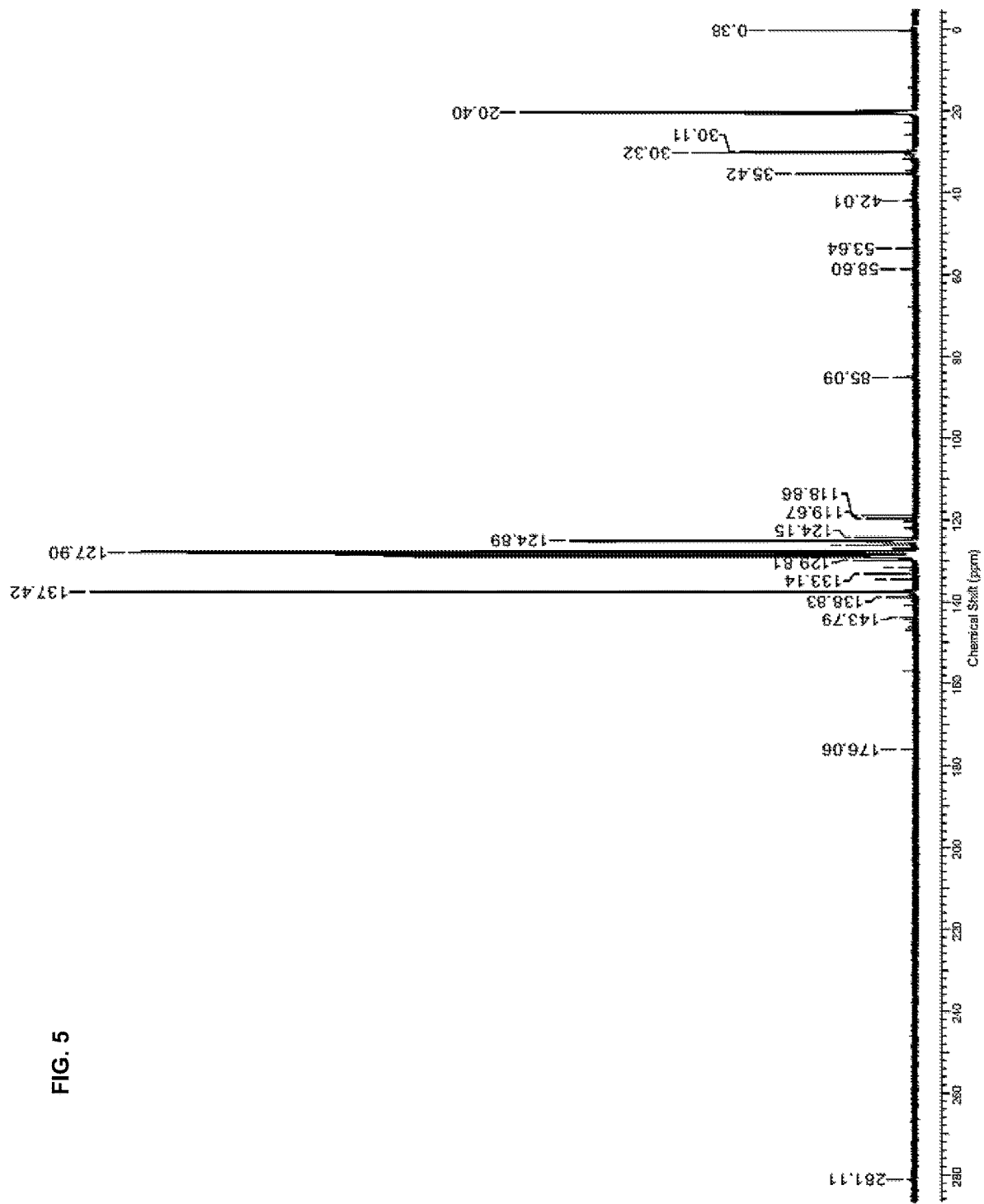
FIG. 5 shows the proton-decoupled $^{13}$C NMR spectrum of metallocyclopropene 2 in toluene-$d_8$ at 25° C.

As shown in FIG. 4 and FIG. 5, characterization data for 2; red-orange solid, yield 86% $^1$H NMR (500 MHz, toluene-d8), δ (ppm): 7.57 (d, J=7.5 Hz, 1H, Ar—H), 7.34 (d, J=7.5 Hz, 1H, Ar—H), 7.29 (t, J=7.6, 2H, Ar—H), 6.94 (t, J=7.6 Hz, 2H, Ar—H), 6.88 (d, J=7.5, 1H, Ar—H), 6.74 (t, J=7.6 Hz, 1H, Ar—H), 5.01 (s, 1H, Mo—CH), 3.58 (s, 3H, N—CH$_3$), 3.51 (s, 3H, N—CH$_3$), 1.46 (s, 9H, —C(CH$_3$)$_3$), 1.33 (s, 9H, —C(CH$_3$)$_3$), 0.15 (s, 9H, —Si(CH$_3$)$_3$). $^{13}$C{$^1$H} NMR (125.70 Hz, toluene-d$_8$), δ (ppm): 281.1 (s, Mo=C), 176.0, 143.8, 138.8, 134.4, 133.1, 129.8, 127.4, 127.9, 126.0, 124.1, 119.6, 118.9 (aryl), 85.1 (s, Mo—CH), 58.6 (s, N—CH3), 53.6 (s, NH—CH$_3$), 42.1 (s, N—CH$_3$), 35.4 (s, —C(CH$_3$)$_3$), 30.3 (s, —C(CH$_3$)$_3$), 30.1 (s, —C(CH$_3$)$_3$), 0.3 (s, —Si(CH$_3$)$_3$). C$_{35}$H$_{50}$MoN$_2$O$_2$Si: C, 64.20; H, 7.70; N, 4.28. Found: C, 63.97; H, 7.59; N, 4.17.

Figure 15:
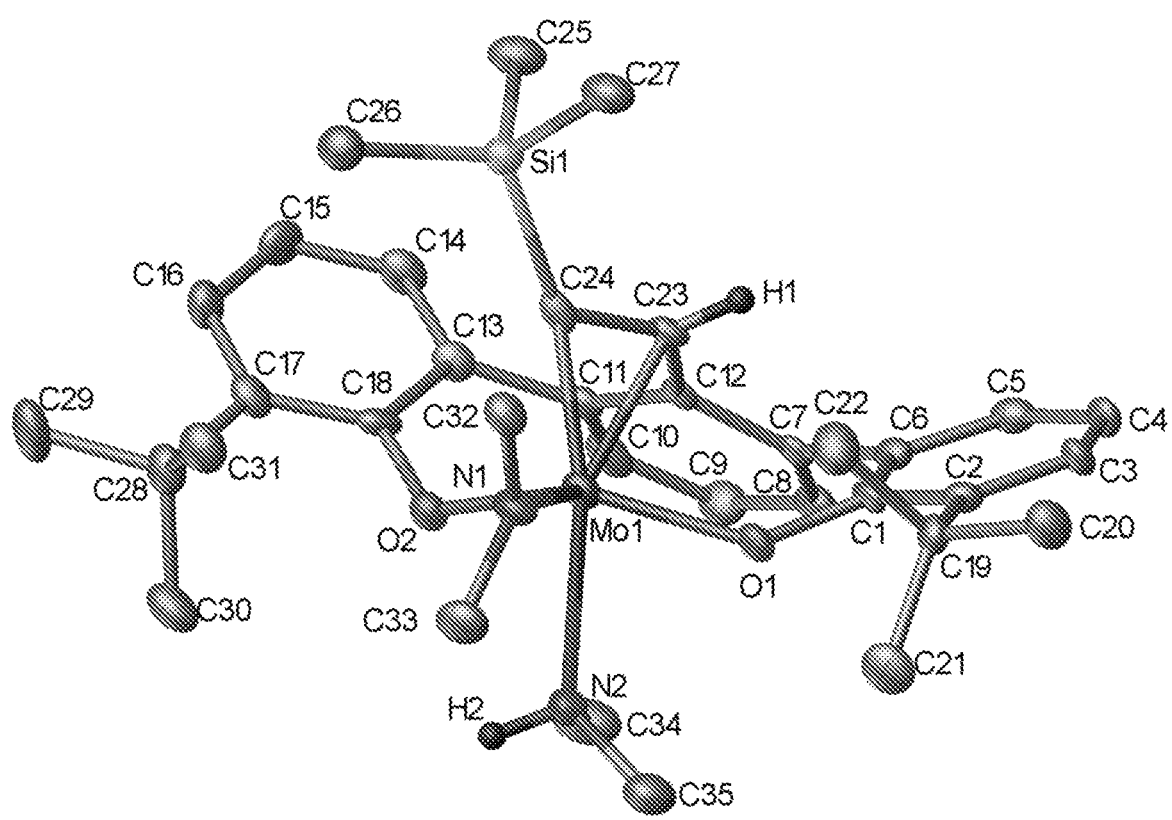
FIG. 15 shows the molecular structure of metallocyclopropene 2 with hydrogen atoms omitted for clarity.

X-ray experimental data for 2 was collected at 100 K on a Bruker SMART diffractometer using MoK$_α$ radiation (0.71073 Å) and an APEXII CCD area detector. Raw data frames were read by program SAINT and integrated using 3D profiling algorithms. The resulting data were reduced to produce hkl reflections and their intensities and estimated standard deviations. The data were corrected for Lorentz and polarization effects and numerical absorption corrections were applied based on indexed and measured faces. The structure was solved and refined in SHELXTL^. 1, using full-matrix least-squares refinement. The non-H atoms were refined with anisotropic thermal parameters and all the H atoms were calculated in idealized positions and refined riding on their parent atoms. The amino proton H2 and proton H23 on C23 were obtained from a Difference Fourier map and refined freely. In the final cycle of refinement, 8641 reflections (of which 4432 are observed with I>2σ(I)) were used to refine 438 parameters and the resulting R$_1$, wR$_2$ and S were 5.97%, 8.93%, and 0.882, respectively. The refinement was carried out by minimizing the wR$_2$ function using F$^2$ rather than F values. R$_1$ is calculated to provide a reference to the conventional R value but its function is not minimized. The molecular structure of 2 with hydrogen atoms omitted for clarity is shown in FIG. 15.

A glass vial was charged with [$^t$BuOCO]Mo(NMe$_2$)(NHMe$_2$)$_2$ (456 mg, 0.758 mmol) and 2 mL of toluene and cooled to −35° C. To the solution was added 3,3-dimethyl-1-butyne (93.3 μL, 0.758 mmol) via micropipette and the mixture was stirred for 3 h at ambient temperature. The reaction mixture was filtered through a thin layer of Celite® and the filtrate was evaporated in vacuo to obtain a solid which was triturated with pentanes (3×1 mL). After triturating the product was dissolved in pentane and filtered to remove any remaining insoluble materials. The filtrate was evaporated in vacuo to provide an analytically pure reddish-orange solid 3 (326 mg, 72%).

Figure 6:
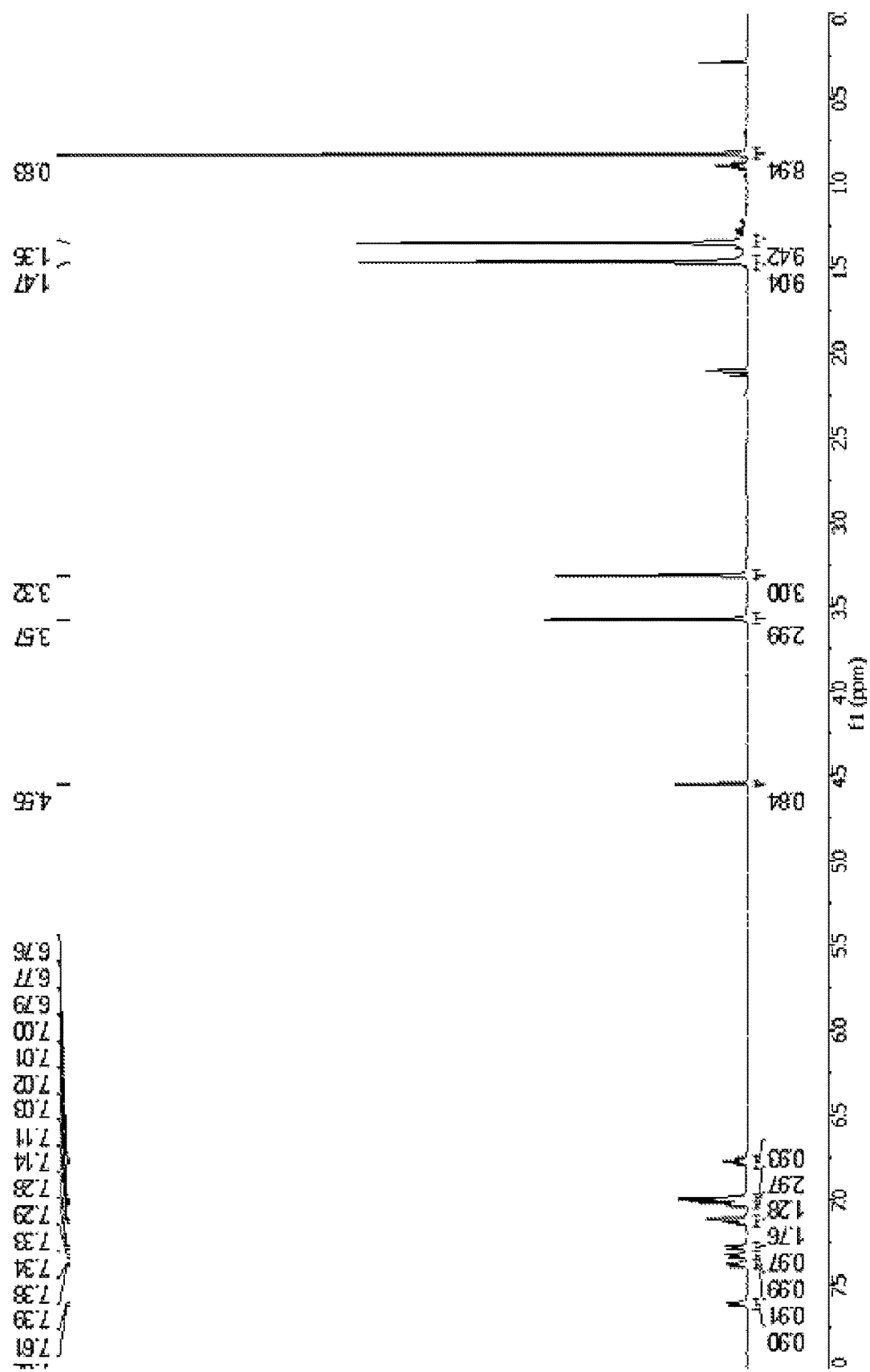
FIG. 6 shows the $^1$H NMR spectrum of metallocyclopropene 3 in $C_6D_6$.

As shown in FIG. 6, characterization data for 3; red-orange solid, yield 72%. $^1$H NMR (500 MHz, C$_7$D$_8$, 25° C.) δ (ppm): 7.62 (d, J=7.5 Hz, 1H, Ar—H$_5$), 7.39 (d, J=7.3 Hz, 1H, Ar—H$_8$), 7.34 (d, J=8.0 Hz, 1H, Ar—H$_3$), 7.29 (d, J=7.7 Hz, 1H, Ar—H$_{14}$), 7.13 (d, J=7.9 Hz, 1H, Ar—H$_{16}$), 7.02 (m, 1H, Ar—H$_4$), 7.01(m, 1H, Ar—H$_9$), 6.99 (d, J=6.3 Hz, 1H, Ar—H$_{10}$), 6.77 (t, J=7.6 Hz, 1H, Ar—H$_{15}$), 4.55 (s, 5, 1H, Mo—CH (H$_{27}$)), 3.58 (s, 3H, N—CH$_3$(H$_{33}$)), 3.32 (s, 3H, N—CH$_3$(H$_{34}$)), 1.47 (s, 9H, ligand C(CH$_3$)$_3$ (H$_{24-26}$)), 1.36 (s, 9H, ligand C(CH$_3$)$_3$ (H$_{20-22}$)), 0.83 (s, 9H, (H$_{30-32}$)). $^{13}$C determined by $^1$H-$^{13}$C gHSQC and gHMBC experiments: (C$_6$D$_6$): δ 281.3 (s, Mo=C (C$_{28}$)), 174.5 (s, C$_{18}$), 155.5 (s, C$_1$), 144.7 (s, C$_{11}$), 144.6 (s, C$_7$), 138.3 (s, C$_2$), 134.7 (s, C$_{17}$), 134.0 (s, C$_{13}$), 133.1 (s, C$_{10}$), 131.7 (s, C$_6$), 129.7 (s, C$_8$), 128.3 (s, C$_9$), 128.2 (s, C$_{14}$), 126.5 (s, C$_5$), 125.7x (s, C$_3$), 125.7x (s, C$_{12}$), 124.2 (s, C$_{16}$), 119.5 (s, C$_4$), 118.5 (s, C$_{15}$), 70.9 (s, C$_{27}$), 56.7 (s, C$_{33}$), 45.5 (s, C$_{29}$), 38.2 (s, C$_{34}$), 35.1 (s, C$_{23}$), 35.0 (s, C$_{19}$), 30.1 (s, C$_{30-32}$), 29.8 (s, C$_{24-26}$), 29.6 (s, C$_{20-22}$). The chemical shifts are assigned according to the numbering in the following structure:

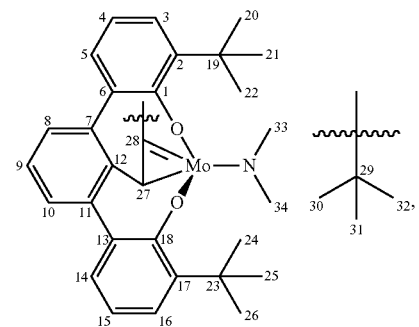

confirmed using $^1$H—$^{13}$C gHSQC, $^1$H—$^{13}$C gHMBC, and NOESY NMR spectra.

The $^1$H NMR spectrum of 3 (benzene-d$_6$) exhibits resonances consistent with a C$_1$-symmetric structure. Two singlets attributable to the pincer $^t$Bu protons in a 1:1 ratio resonate at 1.47 and 1.36 ppm. The amido methyl protons resonate as two singlets at 3.58 and 3.32 ppm further indicating the C$_1$-symmetry of the complex. The metallocyclopropene proton attached to C$_{27}$ resonates at 4.55 ppm. In the $^{13}$C {$^1$H} NMR spectrum, the alkylidene carbon (Mo=C) appears downfield at 281.3 ppm and is attributable to C$_{28}$ of metallocyclopropene. The downfield shift of Mo=C is presumably a consequence of more electron donating —CMe$_3$ substituent, akin to —SiMe$_3$ where a similar Mo=C resonance is observed at 281.1 ppm. A downfield resonance at 70.9 ppm is observed for C$_{27}$ of the metallocyclopropene. Kinetic experiments revealed the rate of inversion for the metallocyclopropene is 4.7 s$^{-1}$ at 25° C. In contrast to previously reported molybdenum metallocyclopropene complexes, where treating [$^t$BuOCO]Mo(NMe$_2$)(NHMe$_2$)$_2$ with the terminal alkynes H—C≡C—R (R: H, Ph, —SiMe$_3$) resulted in formation of a molybdenum ion coordinated by a dimethylamido group, and two carbon atoms, the OCO ligand aryloxides, and a dimethylamine group, when R=$^t$Bu the unexpected result of loss of dimethyl amine occurred. The absence of amine methyl resonance in the $^1$H NMR spectra along with the lack of and N—H stretch in the IR spectrum region of 3200-3400 cm$^{-1}$ supports the expulsion of dimethylamine. Presumably, the steric bulk of the $^t$Bu group causes the expulsion of dimethylamine from the Mo coordination center. Opening a coordination site can be advantageous in catalysis since substrate binding can be rate determining.

Polymerization of norbornene by catalyst (3): Polymerization activity with norbornene was according to Reaction Schemes 2.1 and 2.2 shown below. Briefly, to a 20 ml glass vial charged with norbornene (1 equiv.) in 0.4 ml benzene was added 3 (1 equiv.). The reaction mixture was the taken in J-Young NMR tube and heated at 50° C. for 6 h. After this period the reaction mixture was added dropwise to stirring methanol. The reaction amounts are as given in Table 1 below.

TABLE 1

| Complex | Catalyst (equivalent) | Norbornene (equivalent) | Temperature (° C.) | Time (h) | Conversion | Cis (%) |
|---|---|---|---|---|---|---|
| 3 | 1 | 1 | r.t. | 19 | >99 | >98 |
| 3 | 1 | 1 | 50 | 6 | >99 | >98 |
| 2 | 1 | 1 | 50 | 8 | >84 | >99 |
| 1 | 1 | 1 | 50 | 8 | >44 | >98 |

Polynorbornene precipitates out and is isolated by filtration, and dried overnight under vacuum. Predominantly cis product is obtained with trace amount of trans product. $^1$H NMR spectral assignments were consistent with literature reports.

Reaction Scheme 2.1.

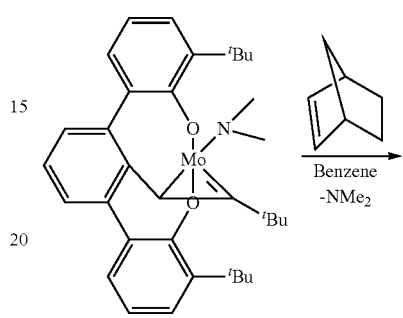

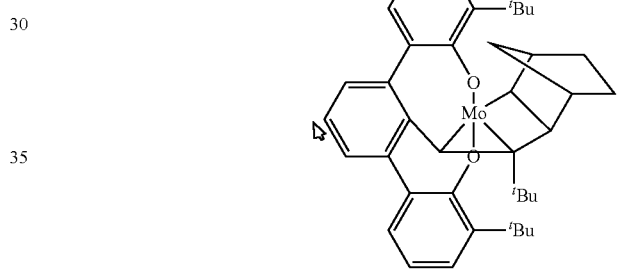

Reaction Scheme 2.2

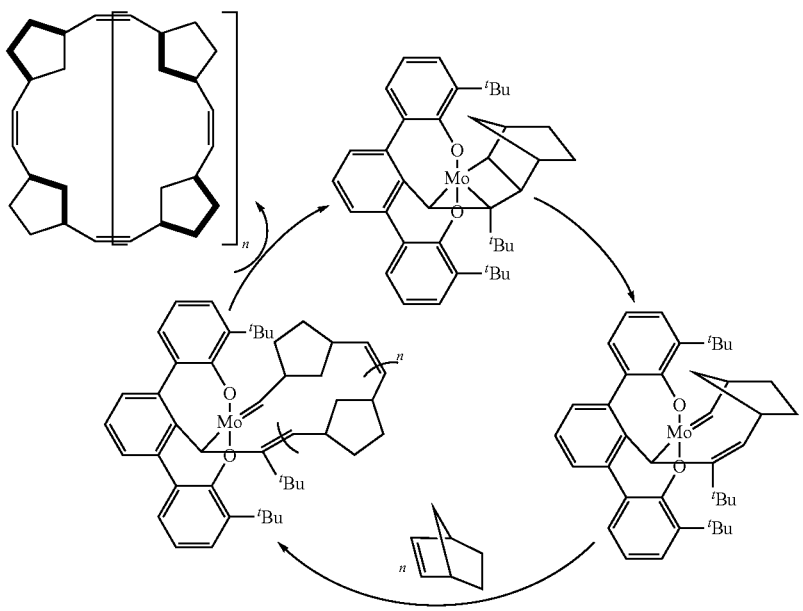

Figure 7:
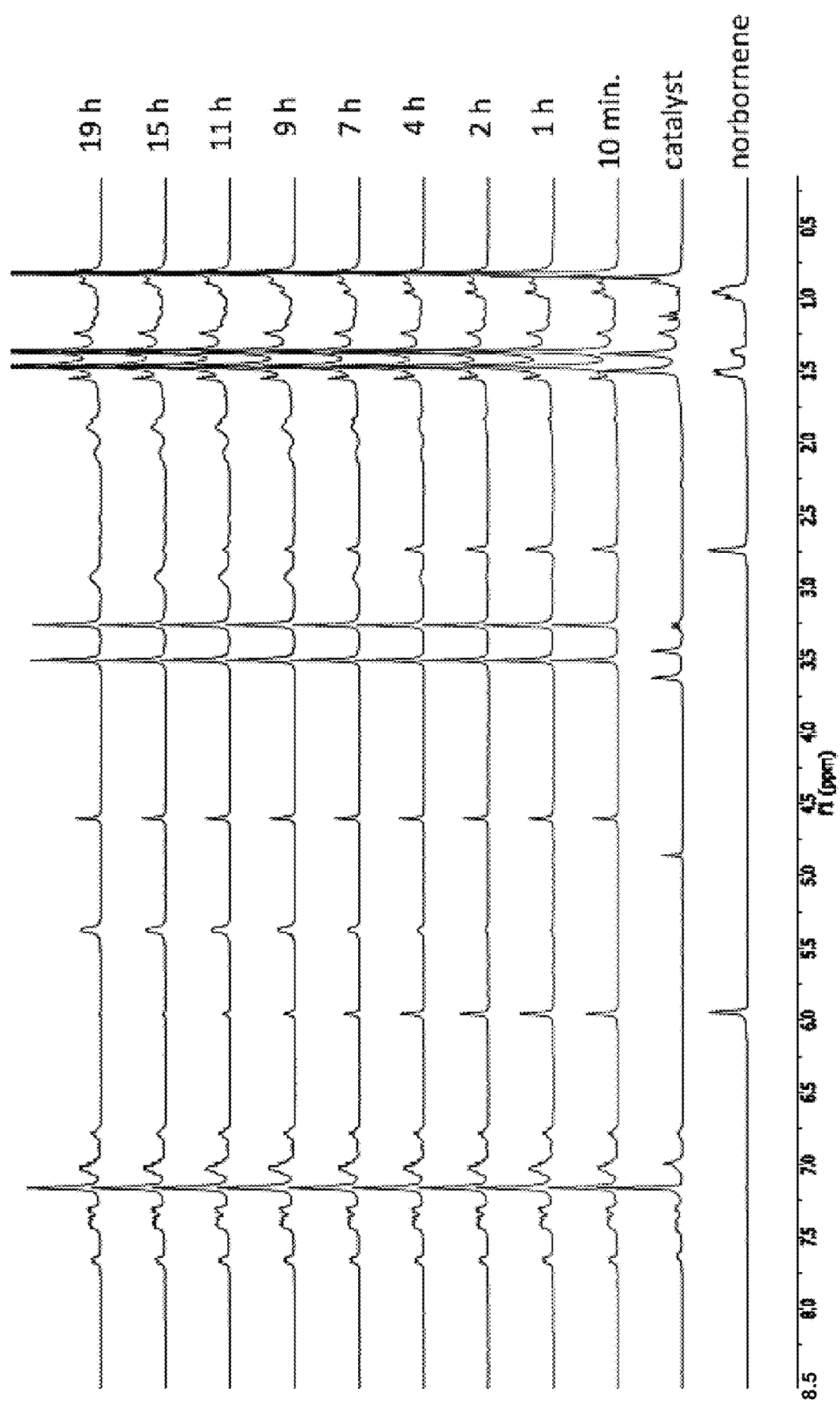
FIG. 7 shows the $^1$H NMR spectrum of metallocyclopropene 3 with norbornene at room temperature in $C_6D_6$.
Figure 8:
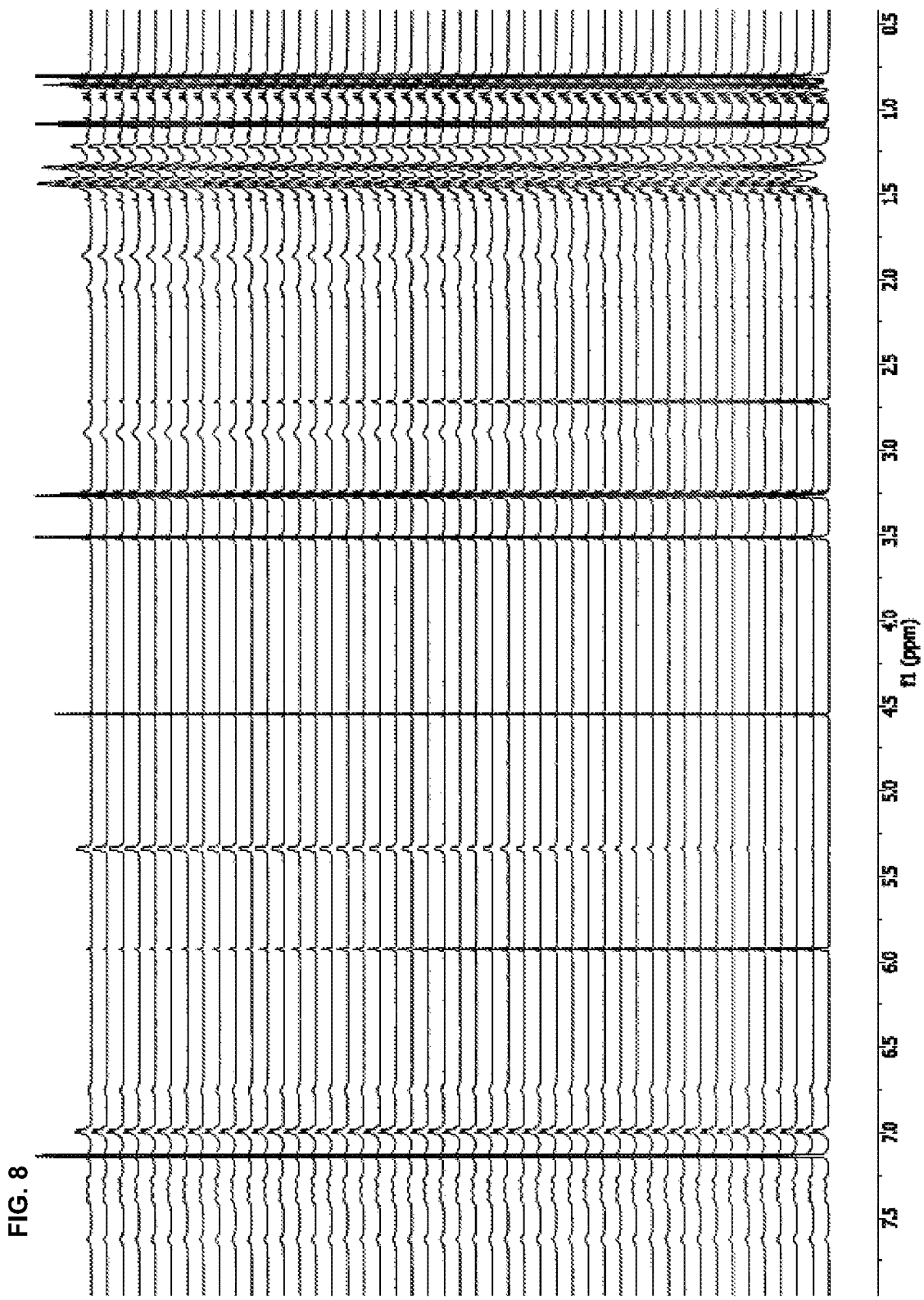
FIG. 8 shows the $^1$H NMR spectrum of metallocyclopropene 3 with norbornene at 5-minute intervals for 4 h at 50° C. in $C_6D_6$.
Figure 9:
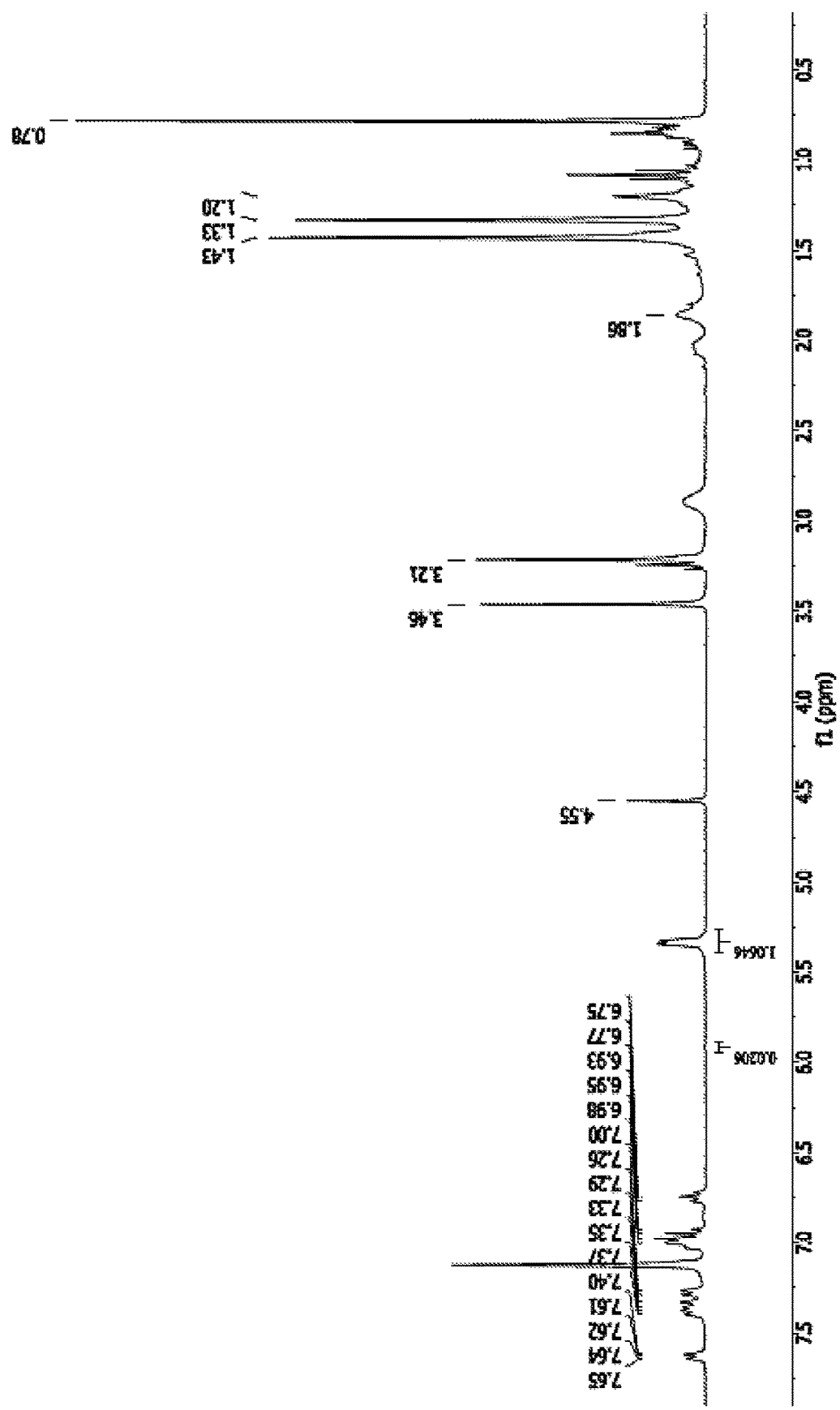
FIG. 9 shows the $^1$H NMR spectrum of metallocyclopropene 3 with norbornene after 6 h at 50° C. in $C_6D_6$.

The reaction of 3 with norbornene in $C_6D_6$ was monitored by $^1H$ NMR. FIG. 7 shows the $^1H$ NMR spectrum of 3 with norbornene at room temperature in $C_6D_6$. FIG. 7 shows the consumption of norbornene and growth of polynorbornene over time (e.g., by the disappearance of the peaks at about 5.9 ppm and about 2.75 ppm and the growth of the peaks at about 5.4 ppm and about 2.9 ppm). FIG. 8 shows the $^1H$ NMR spectrum of 3 with norbornene at 5-minute intervals for 4 h at 50° C. in $C_6D_6$. FIG. 8 shows the consumption of norbornene and polynorbornene over time (e.g., by the disappearance of the peaks at about 5.9 ppm and about 2.75 ppm and the growth of the peaks at about 5.4 ppm and about 2.9 ppm). FIG. 9 shows the $^1H$ NMR spectrum of 3 with norbornene after 6 h in $C_6D_6$. FIG. 9 shows the almost full consumption of norbornene (minimal peaks at about 5.9 and about 2.75) and growth of polynorbornene (large peaks at about 5.4 ppm and 2.9 ppm).

Figure 10:
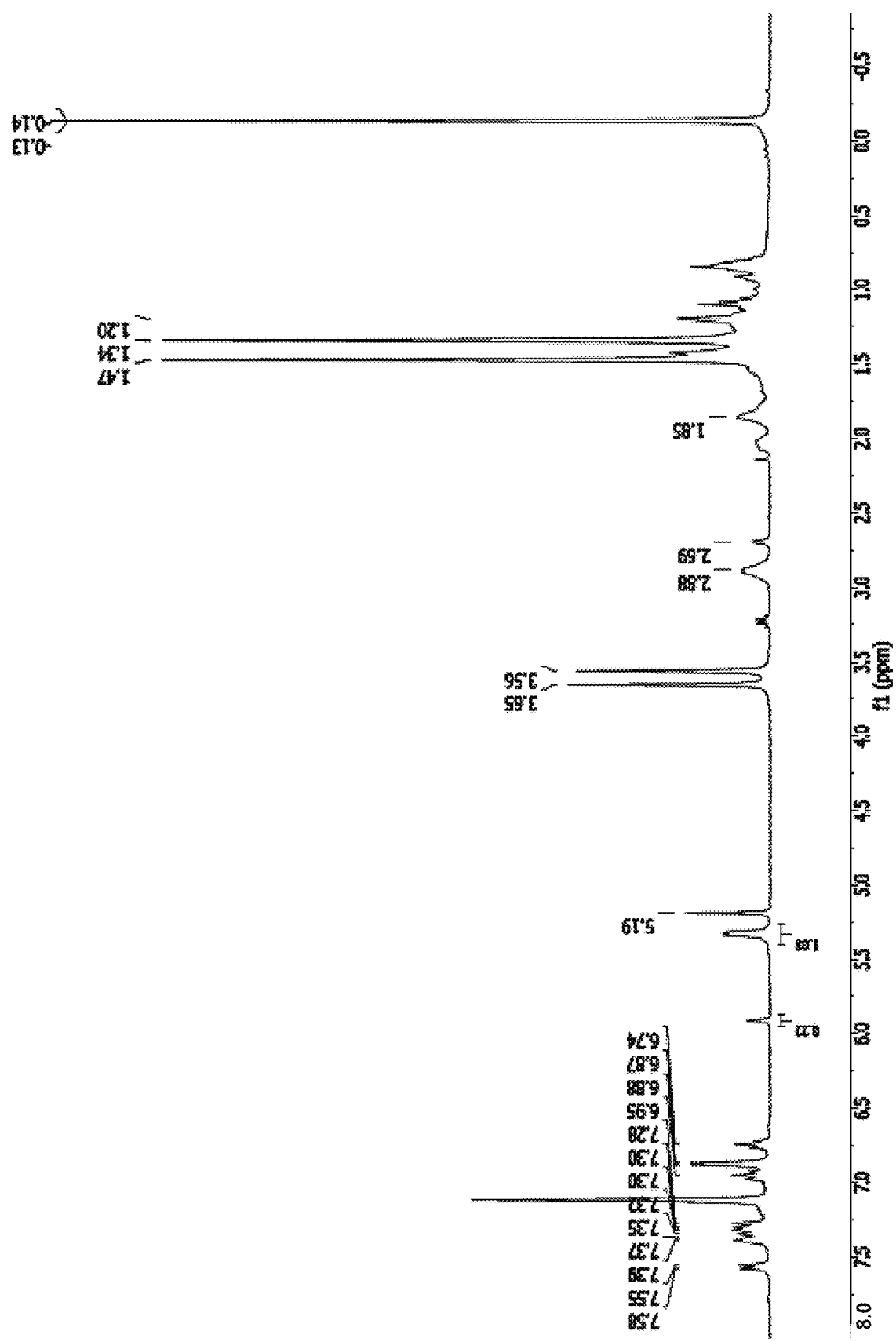
FIG. 10 shows the $^1$H NMR spectrum of metallocyclopropene 2 with norbornene after 8 h at 50° C. in $C_6D_6$.
Figure 11:
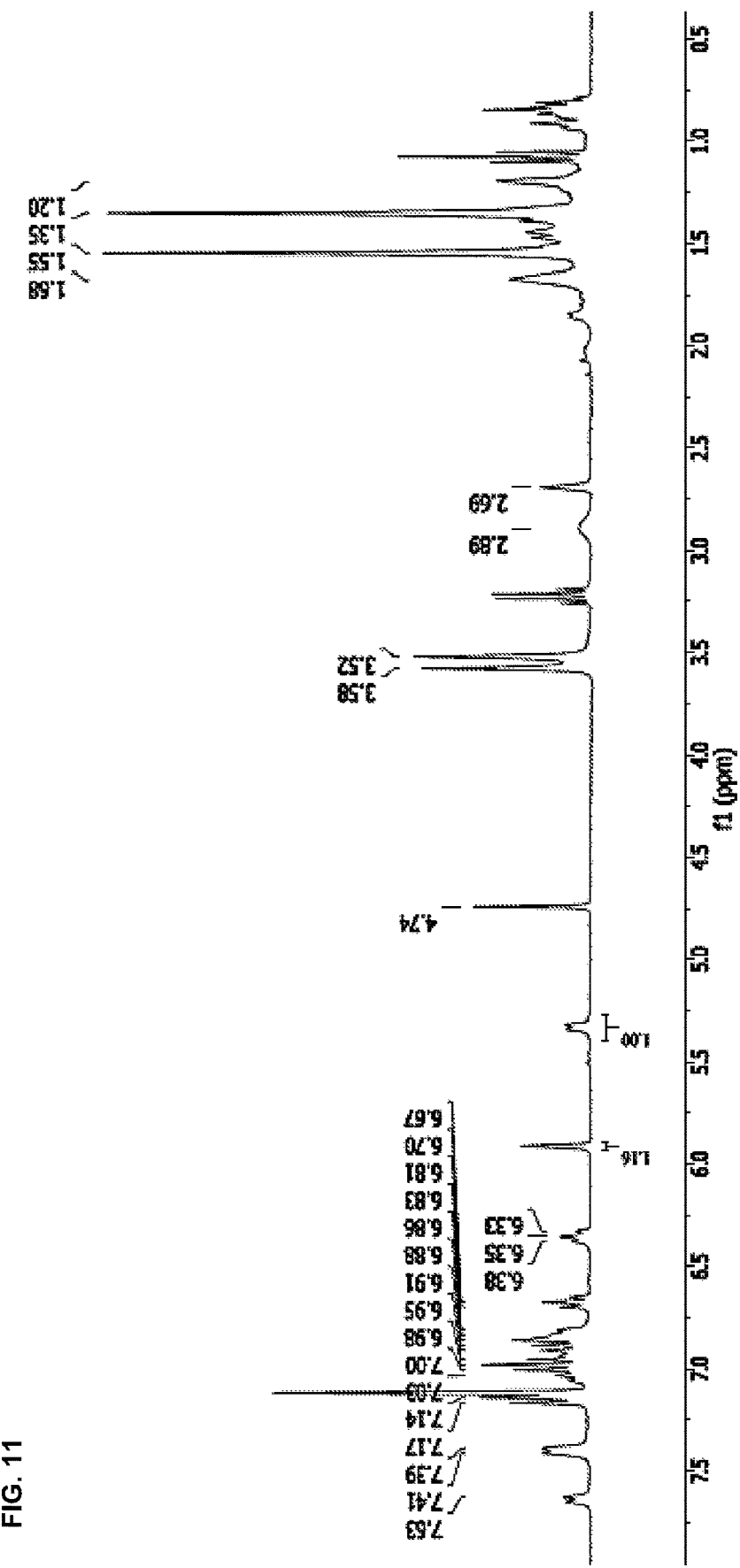
FIG. 11 shows the $^1$H NMR spectrum of metallocyclopropene 1 with norbornene after 8 h at 50° C. in $C_6D_6$.
Figure 12:
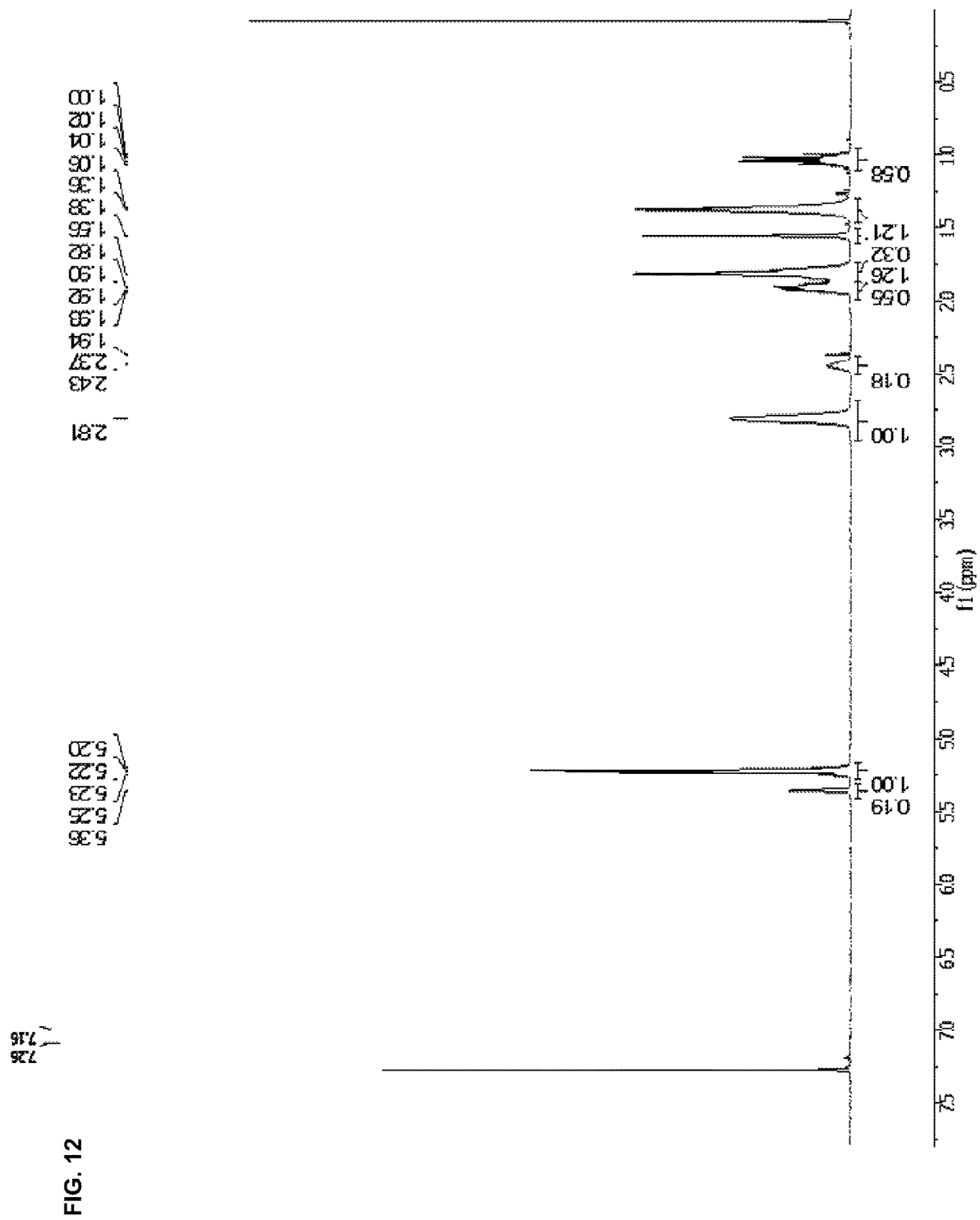
FIG. 12 shows the $^1$H NMR spectrum of polynorbornene generated by metallocyclopropene 3 in $CDCl_3$.
Figure 13:
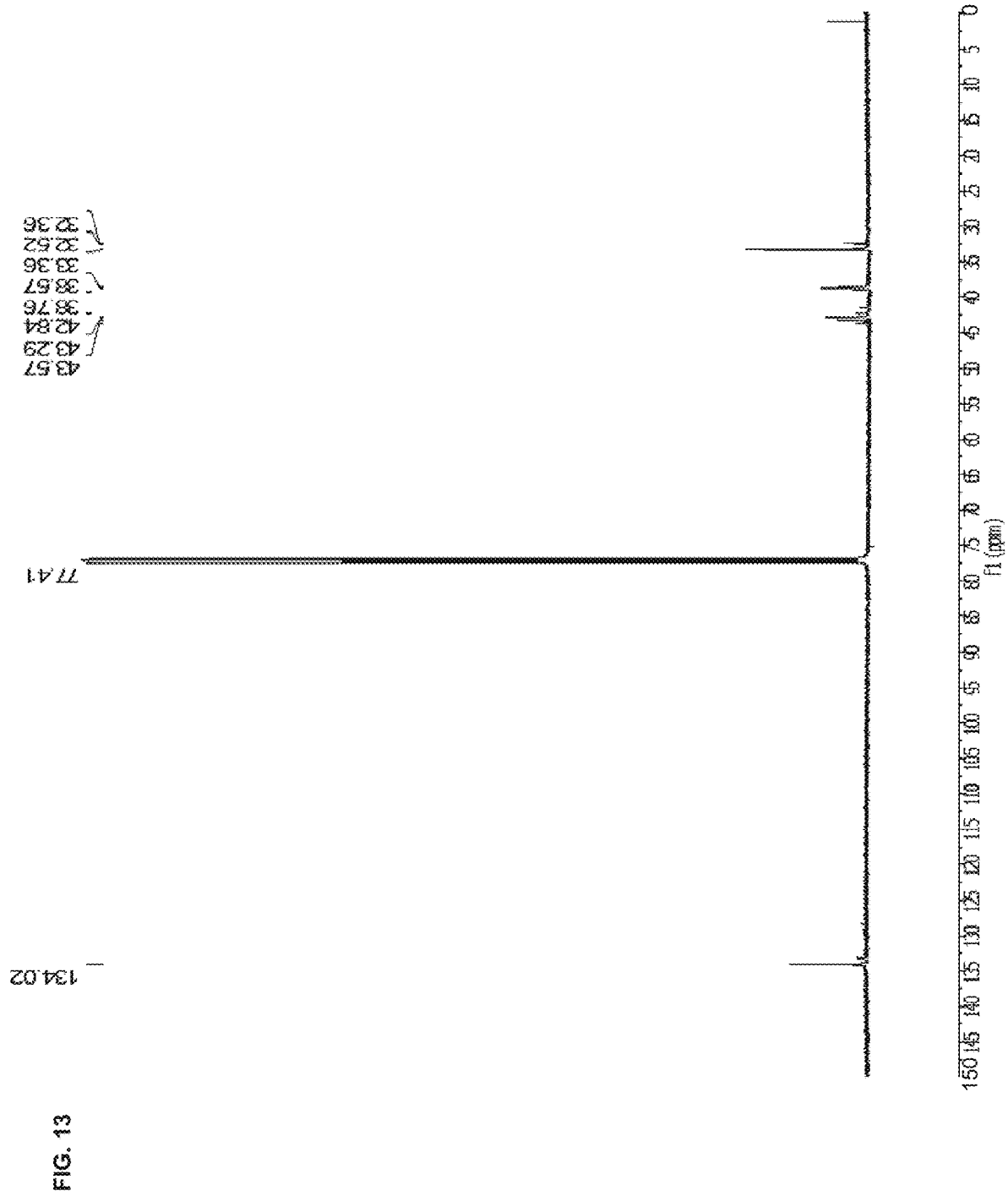
FIG. 13 shows the $^{13}$C NMR spectrum of polynorbornene generated by metallocyclopropene 3 in $CDCl_3$.

FIG. 10 shows the $^1H$ NMR spectrum of metallocyclopropene 2 with norbornene after 8 h at 50° C. in $C_6D_6$. FIG. 11 shows the $^1H$ NMR spectrum of metallocyclopropene 1 with norbornene after 8 h at 50° C. in $C_6D_6$. FIG. 12 shows the $^1H$ NMR spectrum of polynorbornene generated by metallocyclopropene 3 in $CDCl_3$. FIG. 13 shows the $^{13}C$ NMR spectrum of polynorbornene generated by metallocyclopropene 3 in $CDCl_3$.

Polymerization of norbornene by catalyst (3): In a nitrogen filled glovebox, norbornene (51 mg, $5.42 \times 10^{-4}$ mol, 50 equiv.) was dissolved in 5.6 mL of toluene. In another vial a stock solution of the catalyst 3 was prepared (1 mg/mL) and was added to the initial vial in one shot to initiate the polymerization. After heating the mixture at 60° C. for 24 h the mixture was added dropwise to stirring methanol. The mixture was allowed to stir for 30 min. Polynorbornene precipitates as a white solid and was isolated by filtration and dried overnight under vacuum. (46.8 mg, 92%). $^1H$ and $^{13}C$ NMR spectral assignment were consistent with literature reports.

TABLE 2

| Catalyst (stock soln.) | Catalyst (equiv.) | Norbornene (equiv.) | Solvent | Run time (h) 60° C. | $M_n$ (g/mol) | $M_w/M_n$ |
| --- | --- | --- | --- | --- | --- | --- |
| 18 mg/ 18 mL (6.43 mL) | 1 | 50 | toluene | 24 | $6.64 * 10^5$ | 1.75 |
| 18 mg/ 18 mL (2.96 mL) | 1 | 100 | toluene | 24 | $7.19 * 10^5$ | 1.53 |
| 16.2 mg/ 2.4 mL | 1 | 50 | benzene-$d_6$ | 13 | $1.34 * 10^6$ | 1.55 |
| 16.2 mg/ 2.4 mL | 1 | 100 | benzene-$d_6$ | 13 | $1.29 * 10^6$ | 1.49 |
| 16.2 mg/ 2.4 mL | 1 | 150 | benzene-$d_6$ | 13 | $1.14 * 10^6$ | 1.65 |
| 16.2 mg/ 2.4 mL | 1 | 200 | benzene-$d_6$ | 13 | $1.34 * 10^6$ | 1.46 |

The resulting polynorbornene can be hydrogenated via standard $H_2$/Pd/C procedures to provide a stereoregular saturated cyclic polymer, as shown in Reaction Scheme 3, below.

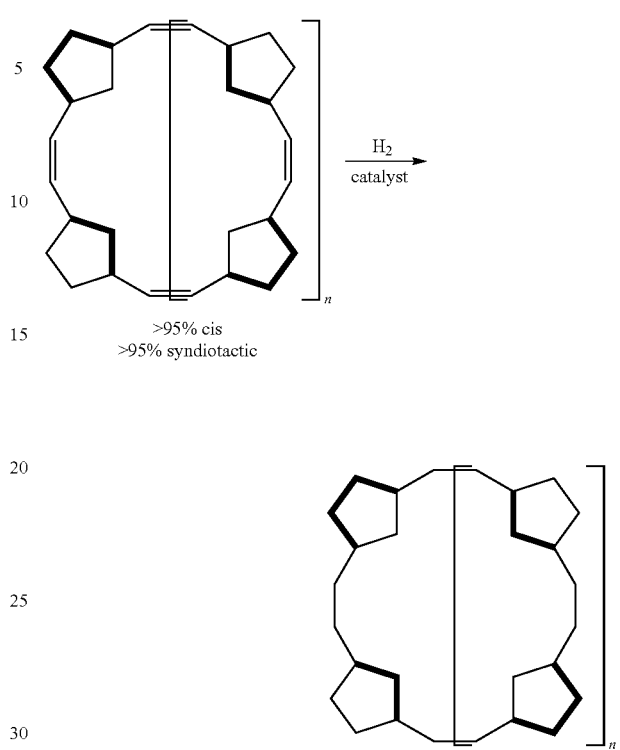

Reaction Scheme 3

>95% cis
>95% syndiotactic

Figure 16A:
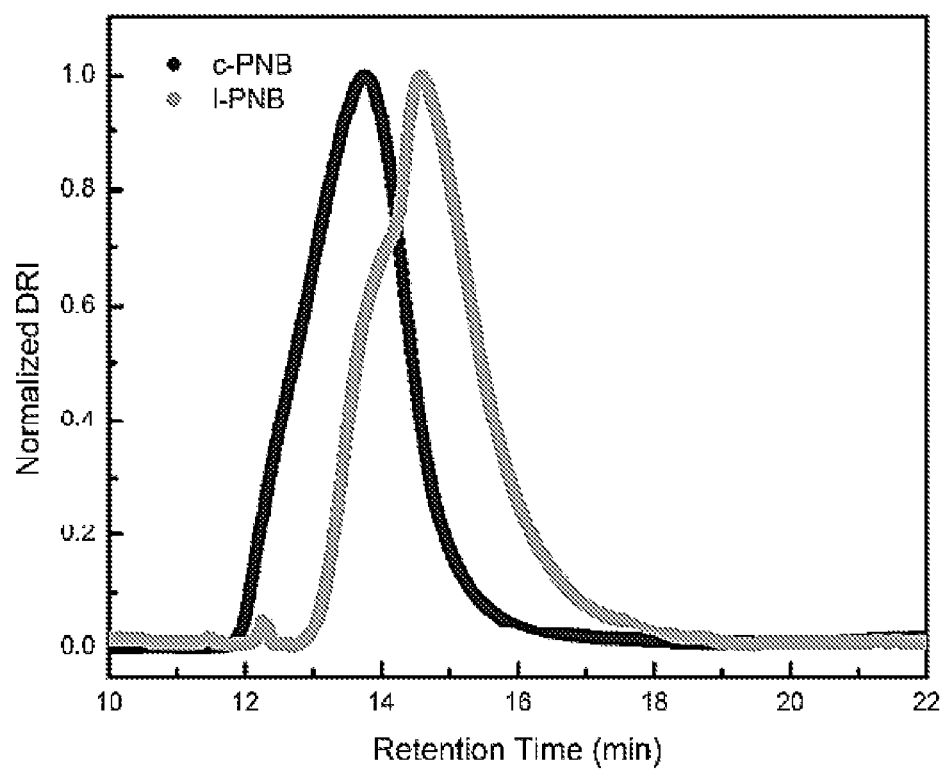
FIG. 16A shows a plot of normalized DRI vs retention time for cyclic polynorbornene (left curve) and linear polynorbornene (right curve).
Figure 16B:
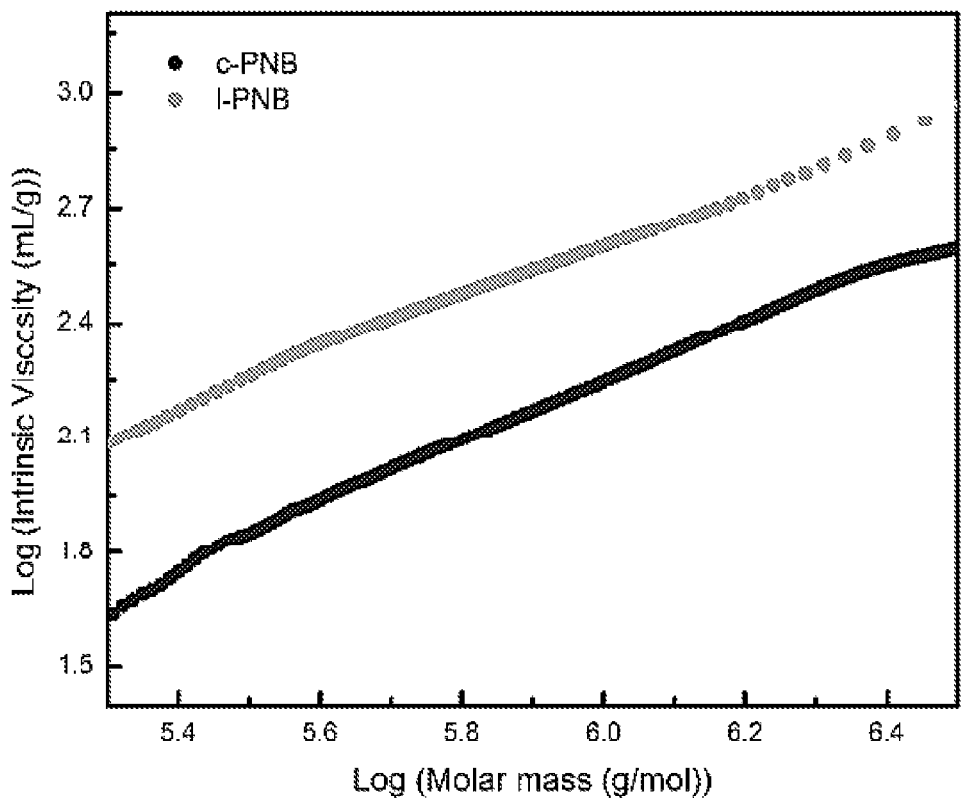
FIG. 16B shows a plot of log([η]) vs log (molar mass) for cyclic polynorbornene (bottom) and linear polynorbornene (top).
Figure 16C:
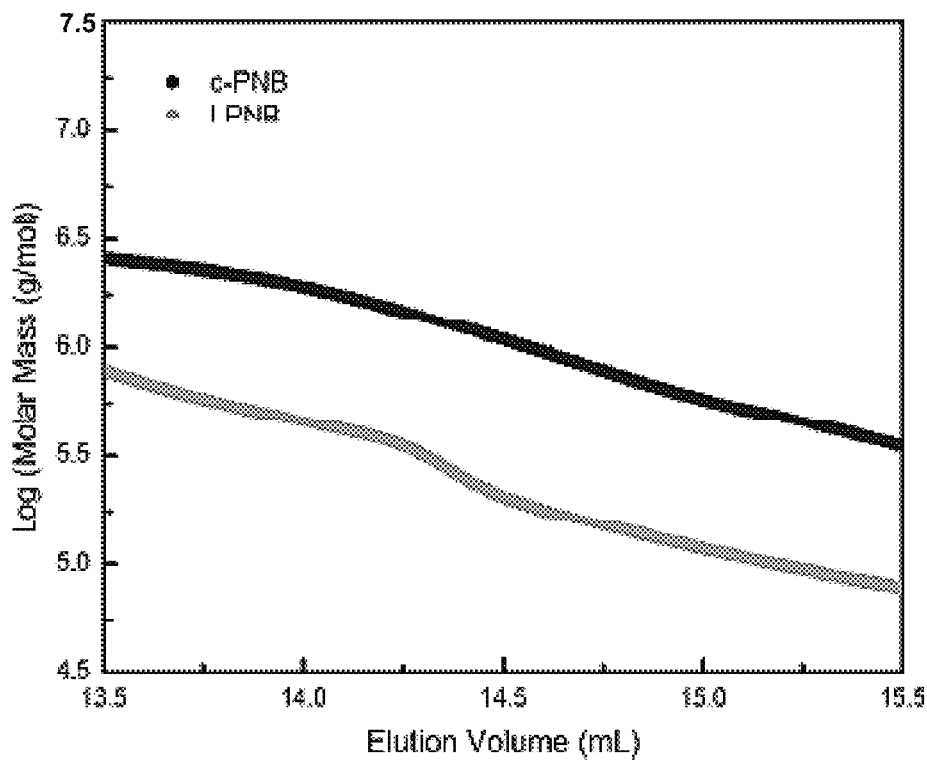
FIG. 16C shows a plot of log (molar mass) vs elution volume for cyclic polynorbornene (top) and linear polynorbornene (bottom).
Figure 16D:
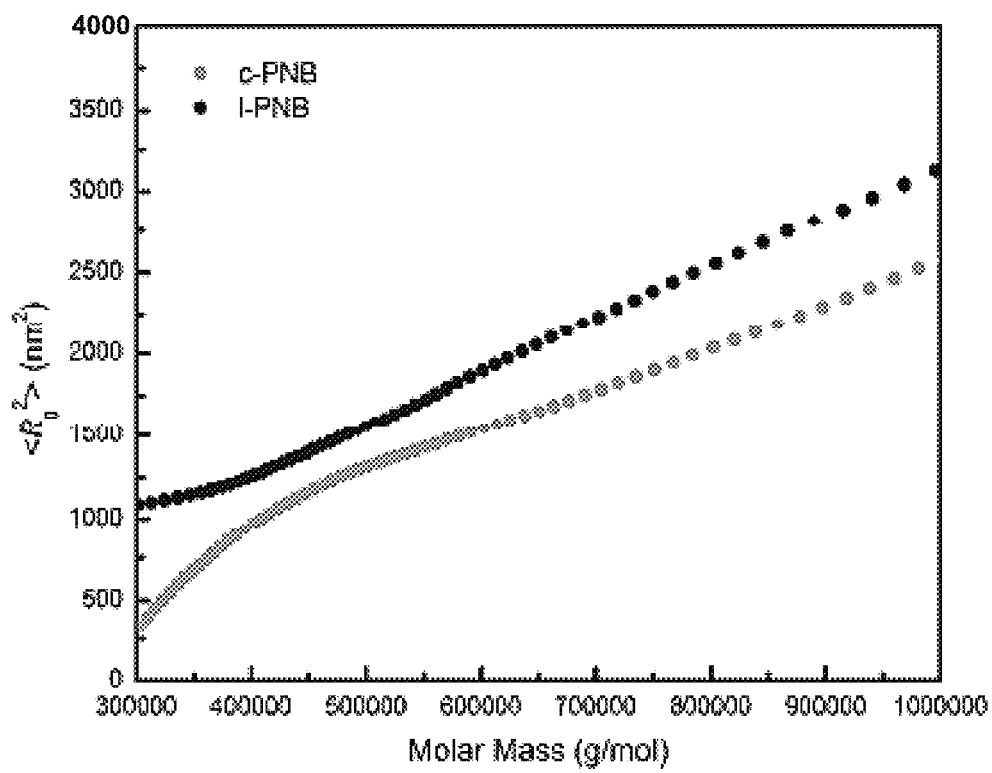
FIG. 16D shows a plot of mean square radius <$Rg^2$> vs molar mass for cyclic polynorbornene (top) and linear polynorbornene (bottom).

Evidence for the cyclic topology comes from comparing the intrinsic viscosities [η] of linear versus cyclic polynorbornene as a function of Mw. Due to their smaller hydrodynamic radii, cyclic polymers have lower intrinsic viscosities then linear polymers of the similar molecular weight. A Mark-Houwink-Sakurada (MHS) plot (log [η] versus log M, where [η] is the intrinsic viscosity and M is the viscosity-average molar mass confirms the lower intrinsic viscosity of the cyclic polymers relative to the linear polymers. The polymers produced by the catalyst 3 have lower intrinsic viscosities (FIG. 16B), one of the hallmark of a cyclic topology. Furthermore, cyclic polymers have smaller hydrodynamic radii than their equivalent linear analogues (FIG. 16D). Consequently, cyclic polymers have shorter elution times for a given absolute molecular weight during size-exclusion chromatography (SEC) (FIG. 16A). The difference in the plots of log(Molar mass) versus elution volume (FIG. 16C) are consistent with linear versus cyclic polymers.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

That which is claimed is:

1. A compound having a structure represented by a formula:

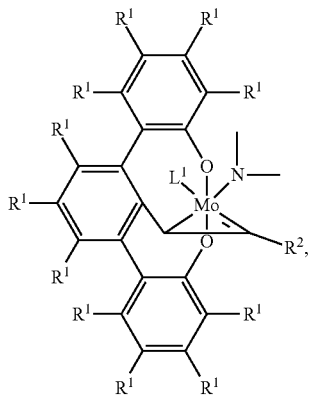

wherein each occurrence of $R^1$ is independently selected from H and C1-C6 alkyl, or two adjacent $R^1$ are linked to form a five- to eight-member cyclic group; and wherein $R^2$ is selected from $Ar^1$, C1-C22 alkyl, halo, C1-C22 haloalkyl, hydrogen, amino, alkoxy, ether, and $(R^3)_3$—Si—; and wherein $L^1$ is absent or selected from phosphine, amine, or five- or six-membered monocyclic groups containing 1 to 4 heteroatoms;

wherein $Ar^1$ is an aryl or heteroaryl, with the proviso that when $R^2$ is $Ar^1$ then $Ar^1$ is pyrrolyl, furanyl, thiophenyl, imidazolyl, pyrazolyl, oxazolyl, isoxazolyl, thiazolyl, pyridinyl, pyrazinyl, pyrimidinyl, pyridazinyl, triazinyl, benzofuranyl, isobenzofuranyl, indolyl, isoindolyl, benzothiophenyl, benzimidazolyl, purinyl, indazolyl, benzoxazolyl, benzisoxazolyl, benzothiazolyl, maphthalenyl, anthracenyl, quinolinyl, isoquinolinyl, quinoxalinyl, acridinyl, quinazolinyl, cinnolinyl, phthalazinyl, or naphthyl; and wherein each occurrence of $R^3$ is independently selected C1-C22 alkyl, $Ar^1$, —O—(C1-C22 alkyl), —O—$Ar^1$, —N—(C1-C22) alkyl, or —N—$Ar^1$;

provided that $R^2$ is not $(CH_3)_3$—Si—.

2. The compound of claim 1, wherein the compound has a structure represented by a formula:

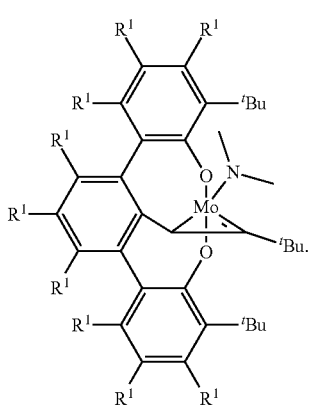

3. The compound of claim 1, wherein each $R^1$ is independently selected from H, methyl, ethyl, propyl, butyl, pentyl, and hexyl.

4. The compound of claim 1, wherein the compound has a structure represented by a formula:

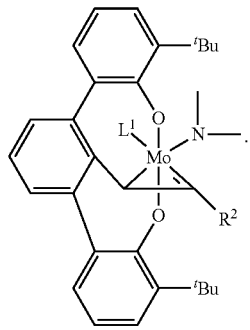

5. The compound of claim 1, wherein $R^2$ is selected from methyl, ethyl, propyl, butyl, pentyl, hexyl, and naphthyl.

6. The compound of claim 1, wherein $R^2$ is $Ar^1$.

7. The compound of claim 1, wherein $L^1$ is absent or is an amine.

8. The compound of claim 1, wherein $L^1$ is absent and $R^2$ is t-butyl.

9. The compound of claim 1, wherein the compound has a structure represented by a formula:

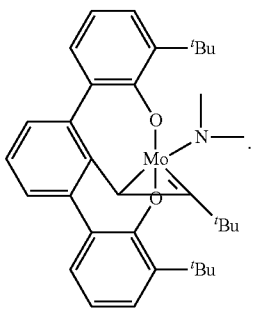

10. A method for making a compound according to claim 1, the method comprising providing a complex having a structure represented by a formula:

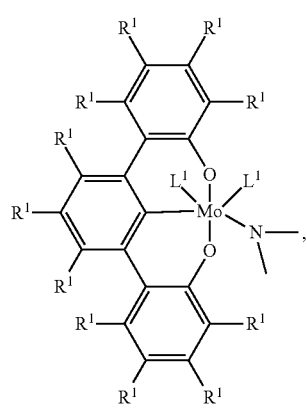

wherein each occurrence of $R^1$ is independently selected from H and C1-C6 alkyl; and wherein each occurrence of $L^1$ is selected from phosphine, amine, or five- or six-membered monocyclic groups containing 1 to 4 heteroatoms or both $L^1$ together comprise a bidentate ligand;

and reacting with a terminal alkyne having a structure represented by a formula:

wherein $R^2$ is selected from $Ar^1$, C1-C22 alkyl, and $(R^3)_3$—Si—;

wherein each occurrence of $R^3$ is independently selected from C1-C22 alkyl or $Ar^1$; and wherein $Ar^1$ is an aryl or heteroaryl, with the proviso that when $R^2$ is $Ar^1$ then $Ar^1$ is pyrrolyl, furanyl, thiophenyl, imidazolyl, pyrazolyl, oxazolyl, isoxazolyl, thiazolyl, pyridinyl, Pyrazinyl, pyrimidinyl, pyridazinyl, triazinyl, benzofuranyl, isobenzofuranyl, indolyl, isoindolyl, benzothiophenyl, benzimidazolyl, purinyl, indazolyl, benzoxazolyl, benzisoxazolyl, benzothiazolyl, maphthalenyl, anthracenyl, quinolinol, isoquinolinyl, quinoxalinyl, acridinyl, quinazolinyl, cinnolinyl, phthalazinyl, or naphthyl;

provided that $R^2$ is not $(CH_3)_3$—Si—;

thereby yielding a compound according to claim 1.

11. The method of claim 10, wherein the complex has a structure represented by a formula:

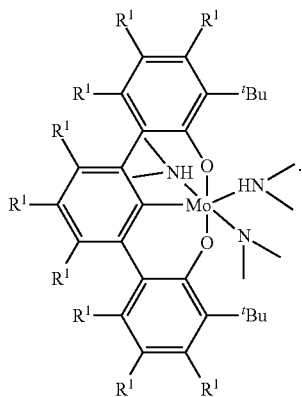

12. The method of claim 10, wherein the complex has a structure represented by a formula:

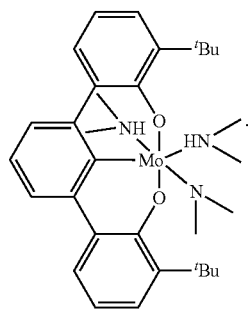

13. A method for ring expansion metathesis polymerization comprising:

reacting a compound of claim 1; and one or more cyclic alkenes to form an unsaturated cyclic polymer.

14. The method of claim 13, wherein the cyclic alkene comprises one or more of cyclopropene, cyclobutene, cyclopentene, cycloheptene, cyclooctene, norbornene, dicyclopentadiene, norbornene anhydride, an ester of norbornene anhydride, an imide of norbornene anhydride, oxanorbornene, oxanorbornene anhydride, an ester of oxanorbornene anhydride, an imide of oxanorbornene anhydride, and substituted variations of the foregoing.

15. The method of claim 13, wherein the cyclic alkene comprises a substituted cyclic alkene and the substitution is not a carboxyl, a carbonyl, an alcohol, or a thiol.

16. The method of claim 13, wherein the cyclic alkene comprises a substituted cyclic alkene and the substitution comprises an alkyl group or an aryl group.

17. The method of claim 13, wherein the compound has a structure represented by a formula:

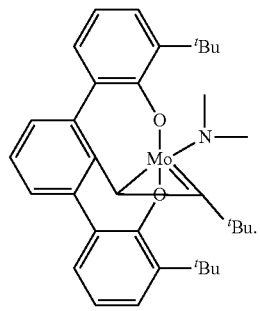

18. The method of claim 13 further comprising hydrogenating the unsaturated cyclic polymer to provide a saturated stereoregular cyclic polymer.

19. The method of claim 18, wherein the saturated stereoregular cyclic polymer has a structure:

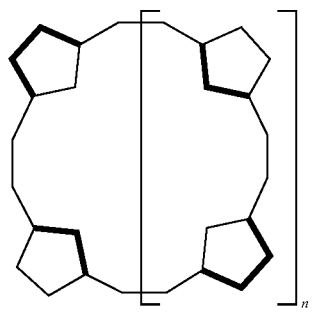

wherein n is a positive integer.

20. The method of claim 18, wherein n is in a range of 1 to 20,000.

* * * * *